Aug. 27, 1968     D. J. BRIDGEFORD     3,399,069

SPRAY DRIED POLYMERIC ALCOHOL XANTHATES

Filed Dec. 8, 1964     3 Sheets-Sheet 1

DOUGLAS J. BRIDGEFORD
INVENTOR.

BY

HIS ATTORNEY

Aug. 27, 1968     D. J. BRIDGEFORD     3,399,069
SPRAY DRIED POLYMERIC ALCOHOL XANTHATES
Filed Dec. 8, 1964     3 Sheets-Sheet 3

DOUGLAS J. BRIDGEFORD
INVENTOR.

BY

HIS ATTORNEY

United States Patent Office 3,399,069
Patented Aug. 27, 1968

3,399,069
SPRAY DRIED POLYMERIC ALCOHOL
XANTHATES
Douglas J. Bridgeford, Danville, Ill., assignor to Tee-Pak, Inc., Chicago, Ill., a corporation of Illinois
Continuation-in-part of application Ser. No. 200,621, June 7, 1962. This application Dec. 8, 1964, Ser. No. 416,795
23 Claims. (Cl. 106—164)

ABSTRACT OF THE DISCLOSURE

Solid dry finely divided polymeric alcohol xanthates, such as xanthates of cellulose, starch, amylose, dextran, sugars, polyvinyl alcohol, polyallyl alcohol, etc., are prepared by spray drying solutions of said xanthates at a pH less than 13. The product is stable at room temperature and is redissolved in water with relative ease.

---

Figure 1:
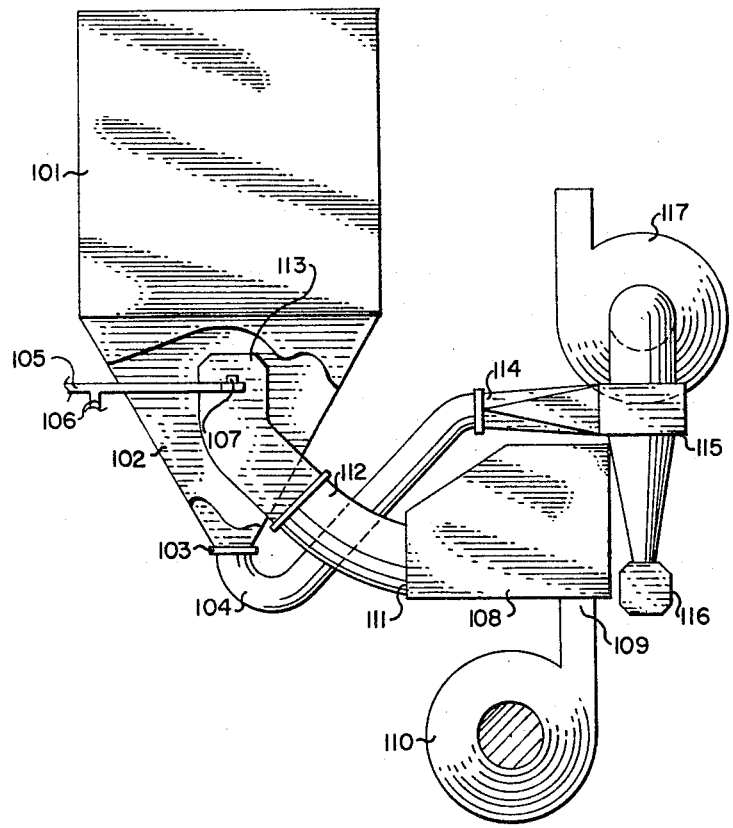

This is a continuation-in-part of the co-pending application of Douglas J. Bridgeford, Ser. No. 200,621, filed June 7, 1962, and now U.S. Patent No. 3,291,789.

This invention relates to the preparation of caustic-free xanthates of polymeric alcohols in finely divided, solid, stable form.

Viscose has been known as an intermediate in the preparation of cellulose compositions for about 70 years. Cellulose xanthate was discovered by Cross and Bevan in 1892 and is prepared by the reaction of carbon disulfide with alkali cellulose. A dilute aqueous alkaline solution of cellulose xanthate is known as viscose and consists of a mixture of sodium cellulose xanthates of varying molecular size, loosely combined with sodium hydroxide and dispersed in the solution together with alkalization and xanthation by-products.

In commercial production, viscose is allowed to age until it reaches the desired ripeness and is then extruded through a die into a coagulating and/or regenerating medium (e.g., ammonium sulfate and/or sulfuric acid) to regenerate cellulose having the configuration of the die through which the viscose was extruded. If the viscose is extruded through a fine hole a filament of rayon is produced. If the viscose is extruded through a narrow slit, a film of regenerated cellulose is produced. If the viscose is extruded through a thin annular opening a tubular film of regenerated cellulose is produced which may be used as an artificial sausage casing. Viscose has also been used for impregnating paper or fabric (including non-woven fabrics and webs) for regenerating cellulose therein by subsequent treatment with acid.

Attempts have also been made to regenerate viscose thermally to avoid the necessity for acid resistant equipment which is required in acid regeneration processes. The acid regeneration of viscose and the thermal regeneration of viscose both result in the formation of large amounts of salts and other undesirable by-products similar in weight to the cellulose which necessitate extensive washing and purification of the regenerated cellulose.

Polymeric alcohols, including carbohydrates and polysaccharides, such as starch, amylose, dextran, sugars, polyvinyl alcohol, polyallyl alcohol, etc., are known to form alkali derivatives from which the corresponding xanthates can be prepared by reaction with carbon disulfide. The purification of these materials and regeneration of products therefrom present economic and technical problems which are similar to the purification and regeneration of cellulose from viscose.

In my co-pending patent application, Ser. No. 200,621, filed June 7, 1962, there are described several inexpensive processes for decausticizing various polymeric alcohol xanthates. In that patent application there are described processes in which alkaline solutions of various polymeric alcohol xanthates are decausticized by dialysis or by treatment with ion exchange or ion retardation materials.

Solutions of polymeric alcohol xanthates which have been decausticized as described in my prior co-pending patent application are especially useful as wet and dry strength additives for paper and for various other purposes as described in said application. Decausticized polymeric alcohol xanthate solutions can be regenerated into films or filaments or tubular casings by treatment with acid and/or by thermal regeneration. These decausticized solutions, however, contain such a high proportion of water that it has been uneconomical to manufacture such solutions for commercial use at any location other than the place at which the xanthate solution was prepared. Also, it has been found that decausticized xanthate solutions tend to decompose, lose xanthate sulfur, and gradually become insoluble after storage for extended periods of time. The decomposition of the xanthate groups is accelerated at higher temperatures. It has thus been necessary to refrigerate decausticized polymeric alcohol xanthate solutions if they are to be stored for any extended period of time.

While the decausticized polymeric alcohol xanthate solutions described in my co-pending patent application are useful for a variety of purposes, the problems of storage and cost of shipping excessive amounts of water have retarded the commercial use of these materials. It has been considered highly desirable to find some economic means to convert these materials into a dry, solid form which is stable for extended periods of storage and which can be reconstituted by mixture with or dispersion in water or other solvent.

It is, therefore, one object of this invention to provide a new and improved process for preparing xanthates of polymeric alcohols in finely divided, solid, stable form.

Another object is to provide a finely divided, solid stable product comprising a decausticized polymeric alcohol xanthate.

Still another object of this invention is to provide novel products derived from solutions or dispersions prepared from a finely divided, solid, stable, decausticized, polymeric alcohol xanthate.

A feature of this invention is the provision of a new and improved process for preparation of polymer alcohol xanthates in a finely divided, solid, stable form by decausticization followed by spray drying.

Another feature of this invention is the provision of a process wherein a solution of a polymeric alcohol xanthate is decausticized and spray dried to produce a powdered, finely divided, stable, solid which is substantially dry and has a D.S. (degree of substitution expressed as percentage of available sites substituted) of at least 3%.

Still another feature of this invention is the provision of an improved process in which a solution of a polymeric alcohol xanthate is decausticized to a pH less than 13 by dialysis, ion exchange, ion retardation, or neutralization with very weak acid, followed by spray drying to produce a powdered product which is substantially dry and has a D.S. of at least 3%.

Still another feature of this invention is the provision of a novel composition comprising a polymeric alcohol xanthate having a pH less than 13 when diluted to 1% concentration in water, which is a finely divided, solid, stable, dry powder having a D.S. of at least 3%.

Still another feature of this invention is the provision of a novel composition prepared by admixture of a solid decausticized polymeric alcohol xanthate with water or other solvent.

Still another feature of this invention is the provision of new and improved products containing regenerated polymeric alcohols, such as cellulose, amylose and the like, derived from solutions of a dry stable powder of a decausticized polymeric alcohol xanthate.

Other objects and features of this invention will become apparent from time to time throughout the specification and claims as hereinafter related.

SUMMARY OF THE INVENTION

In the preparation of viscose and other polymeric alcohol xanthates, many undesired by-products are formed. In the past, viscose and other polymeric alcohol xanthate solutions have been regenerated by treatment with an acid with the result that large amounts of salts are formed within the regenerated material. It was previously considered impractical to reduce the proportion of salts in the regenerated polymeric alcohol product by neutralization of the aqueous caustic solutions due to the fact that any attempt to neutralize excess caustic with acid would result in a localized region of very low pH and high salt concentration which would tend to coagulate the polysaccharide and produce a heterogeneous product.

In my above-mentioned co-pending patent application, it is reported that polymeric alcohols, principally filmforming carbohydrates or polysaccharides, such as cellulose, starch, amylose, dextran, etc., in the form of their caustic xanthate solutions, can be decausticized by dialysis, ion exchange, and/or ion retardation. The various procedures for decausticization of various xanthate solutions are described in considerable detail in that patent application.

I have now found that decausticized solutions of polymeric alcohol xanthates, such as cellulose, starch, amylose, dextran, sugars, polyvinyl alcohol, polyallyl alcohol, etc., can be converted to finely divided, solid, stable products by spray drying. The decausticized solutions (which have been decausticized to a pH less than 13) are subjected to spray drying using a large volume of very dry heated air, at a temperature of at least 38° C. to produce a powdered polymeric alcohol xanthate product which is substantially dry and has a D.S. of at least 3%.

The term D.S. as used herein refers to the degree of substitution of the polymeric alcohol expressed as a percentage of available groups capable of substitution which are in fact substituted with the xanthate radical. Thus, a polyvinyl alcohol xanthate having a xanthate group for every ten vinyl groups would have a D.S. of 10%. A cellulose xanthate, however, containing one xanthate group for every ten anhydroglucose groups would have a D.S. of 3⅓% because cellulose can contain up to three xanthate substituents per anhydroglucose unit.

I have found that the dry decausticized xanthate powders which can be prepared in this manner can be dissolved or dispersed in water and other solvents or swell sufficiently upon admixture with water to be useful as additives in the formation of paper webs.

It was most unexpected that decausticized xanthate solutions could be spray dried. Viscose is much more stable on extended storage, both at low and elevated temperatures, than is a solution of decausticized cellulose xanthate of the same cellulose content. I have found viscose, however, to be extremely unstable in spray drying. In fact, viscose loses most of its xanthate groups during spray drying and yields a substantially insoluble product. The sodium hydroxide present in viscose is quite damaging to the dried product. Sodium hydroxide is somewhat hygroscopic and thus more water is retained (making the product less stable) in spray dried viscose. Also, the sodium hydroxide present in spray dried viscose attacks cellulose and depolymerizes it.

The spray drying of decausticized polymeric alcohol xanthates can be accomplished using any of the several types of spray dryers which are in commercial use. Spray dryers which can be used in this process include the mixed flow type, horizontal-concurrent type, vertical up flow counter-current type, vertical down flow concurrent type, and vertical up flow concurrent type, although other commercial spray dryers can be used. In the spray drying of decausticized xanthate solutions, the solution is sprayed into a large volume high velocity stream of heated air or other inert gas. Air temperatures of at least 38° C. are required for effective drying and temperatures of the order of 260° C. can be used without excessive decomposition of the product. In fact, with proper adjustment of air flow rates and efficient product collection, it is possible to use air temperatures as high as 316° C. to 420° C.

It should be noted that even where high air temperatures are used the temperature surrounding each particle being dried is approximately the wet bulb temperature of the drying gas and thus the product is not subjected to temperatures substantially above the boiling point of water.

Figure 2:
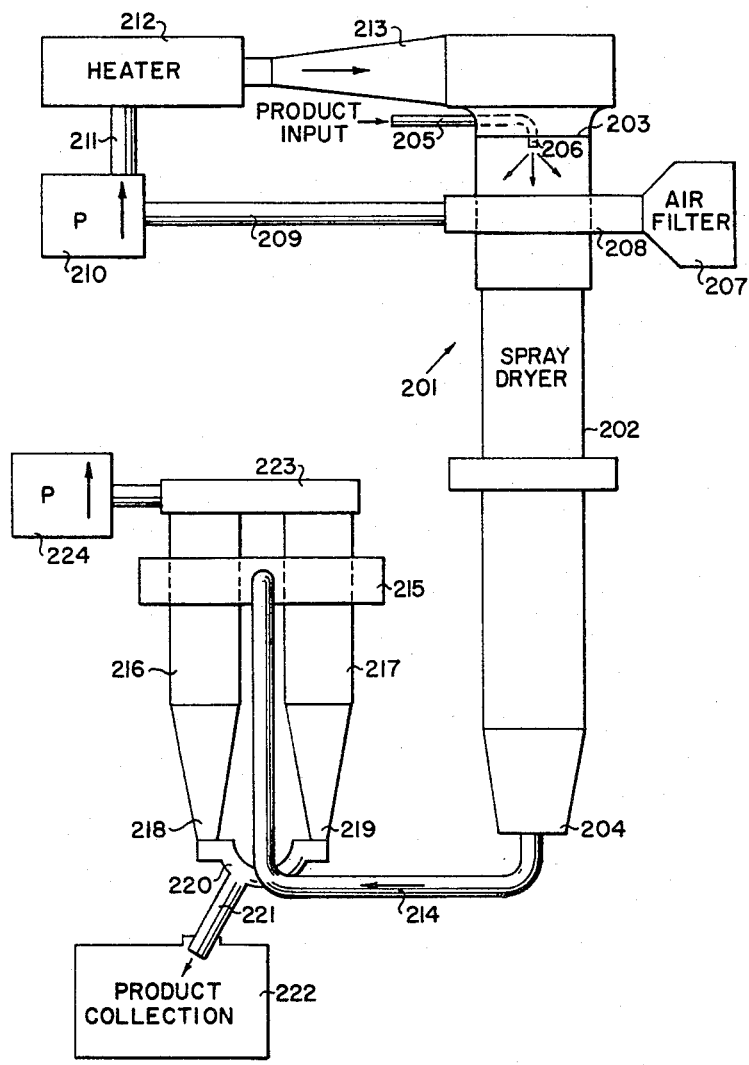
Figure 3:
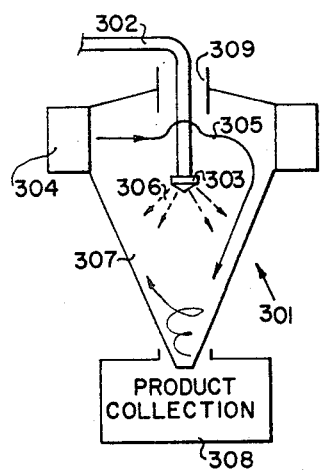
Figure 4:
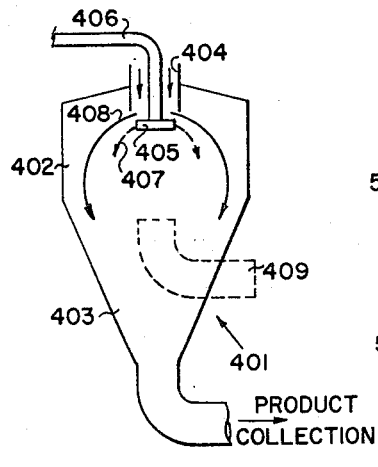
Figure 5:
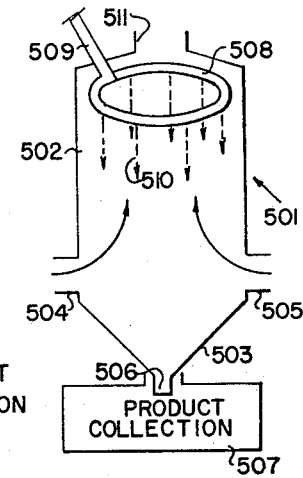
Figures 6, 7:
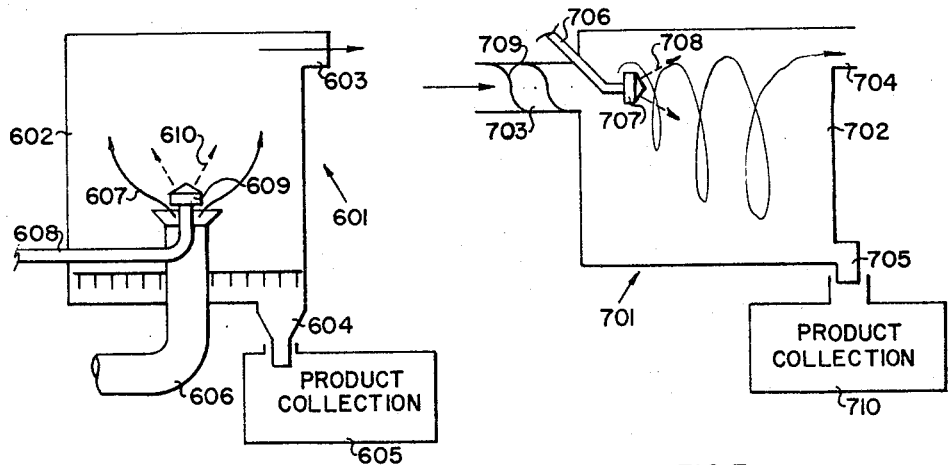

In the accompanying drawings, to be taken as a part of this specification, there are clearly and fully illustrated several examples of spray drying processes and/or apparatus which amy be used in carrying out this invention, in which drawings, FIG. 1 is a diagrammatic view of a concurrent or parallel flow, up-flow type spray dryer, FIG. 2 is a diagrammatic view of a down-flow type, parallel flow spray dryer used in drying various xanthate solutions in accordance with this invention, FIG. 3 is a diagrammatic view of a mixed-flow type spray dryer which can be used in drying various xanthate solutions in accordance with this invention, FIG. 4 is a diagrammatic view of another type of vertical, down-flow concurrent spray dryer, FIG. 5 is a diagrammatic view of a vertical, up-flow countercurrent type spray dryer, FIG. 6 is a diagrammatic view of a vertical, up-flow concurrent type spray dryer, and FIG. 7 is a diagrammatic view of a horizontal concurrent type spray dryer.

DESCRIPTION OF SPRAY DRYING APPARATUS

In FIG. 1 there is shown a spray dryer which is supplied with the liquid to be dried from a pressure tank (not shown). The spray dryer includes drying chamber 101 having a conical outlet portion 102 opening through an outlet 103 to a collection conduit 104. The liquid feed is introduced into the dryer through inlet conduit 105 which is provided with inlet 106 for introduction of air or other gas to atomize the feed. Conduit 105 terminates at spray nozzle 107 in the dryer.

The dryer apparatus is provided with an air heater and filter 108 having inlet 109 connected to air supply fan 110 and an outlet 111 connected to conduit 112 which terminates at 113 in the dryer to provide a flow of heated air over the atomized solution which is to be dried.

Outlet conduit 104 from the base of the dryer is connected as at 114 to cyclone collector 115 which separates the dried powdered product from the air stream. Cyclone collector 115 is provided at its lower end with a product collection reservoir 116 and at its upper end is connected to exhaust fan 117.

The solution which is to be dried is placed in a supply tank from which it is forced under pressure to atomizing nozzle 107 in the dryer. A high pressure stream of air is introduced through inlet connection 106 and mixes with the solution in the atomizing nozzle. The air stream is effective to eject the solution in the form of a hollow cone shaped mist. The production rate of the apparatus is controlled by variation in pressure of the liquid feed and air streams.

Inlet fan 110 supplies air at room temperature (which may be predried) through filter and heater 108 which raises the air temperature to a value sufficient to dry the product being handled. The temperature of the air may range from 38° C. up to 316° C. or higher. The heated air is supplied through air inlet nozzle 113 in a blast which completely surrounds the cone shaped spray of liquid being treated. The atomized solution is carried upward in the drying chamber as a fine mist inside the blast of heated air.

As the cone shaped mist of solution mixes with the blast of hot air, the moisture is evaporated from the individual droplets. This evaporation of moisture causes the heated air stream to be cooled and maintains the surface temperature of the individual droplets at a level not substantially in exceses of the wet bulb temperature of the air stream. The solid product in the spray, which may be finely divided hollow spherical particles, is protected from decomposition by the hot air stream by the reduction in temperature effected by evaporation of liquid from the particles.

The finely divided solid product and air are withdrawn from the drying chamber 101 through bottom outlet 103 and conduit 104. The air and product mixture passes into cyclone collector 115 where the solid product is separated and collected in product collection receptacle 116. The air stream from cyclone collector 115 is withdrawn by exhaust fan 117 and discharged to atmosphere.

In FIG. 2 there is shown a spray dryer apparatus of a commercial type which is used for large scale production of various spray dried food products and which is particularly useful in the preparation of stable, dry, polymeric alcohol xanthate powders. In FIG. 2 there is a diagrammatic showing of a spray dryer 201 comprising tubular chamber 202 having an upper inlet portion 203 and a lower outlet portion 204. A solution which is to be spray dried is introduced through conduit 205 and sprayed into the upper end of chamber 202 by an atomizing nozzle 206. Air for the spray dryer is supplied through filter 207 and manifold 208 surrounding the upper end of dryer chamber 202. Manifold 208 is connected by conduit 209 through blower 210. Blower 210 is in turn connected by conduit 211 to heater 212 which supplies heated air to the inlet 213 of spray dryer 201.

The bottom outlet 204 of spray dryer 201 is connected by conduit 214 to manifold 215 which feeds twin cyclones 216 and 217. Cyclones 216 and 217 have outlets 218 and 219 connected to manifold 220 and conduit 221 leading to a product collection receptacle 222. The upper end of cyclones 216 and 217 are connected to manifold 223 which is connected to blower 224 discharging to atmosphere.

The solution being treated is introduced into spray dryer 201 through conduit 205 and atomizing nozzle 206. The solution is discharged in the form of a conical spray of very fine droplets. Air is supplied by blower 210 and is filtered (and predried, if desired) and heated prior to introduction into spray dryer. The air is supplied at any suitable drying temperature in the range from about 38° C. up to 482° C. In the spray dryer the atomized particles of solution are quickly dried into small particles of hollow spherical form. The evaporation of water (or other solvent) from the solution keeps the surface temperature of the dried particles at a value not substantially in excess of the wet bulb temperature of the heated air.

The flow of air and dried particulate product passes through conduit 214 into cyclones 216 and 217 where the product particles are separated and collected into receptacle 222. The air is then discharged to atmosphere through top or blower 224.

In FIGS. 3 to 7 of the drawings, there are shown examples of a number of different types of spray dryers which can be used in carrying out this invention.

In FIG. 3 there is shown a mixed-flow type spray dryer 301. In this type of dryer, the solution to be treated is fed through conduit 302 and sprayed into the dryer through atomizing nozzle 303.

The feed flows countercurrently to the air and partial drying occurs while the spray mixes with the drying gases. Heated air (which may be predried) is fed into the dryer through inlet 304 and follows the path of the line and arrow 305. The flow path of atomized solution is shown by dotted lines and arrows 306.

Spray dryer 301 is constructed with the bottom portion 307 constructed as a separator and discharging to a product collection receptacle 308. The air is withdrawn through outlet 309 after separation from the solid particulate product.

In this type of dryer the initial flow of the atomized solution is concurrent to the inlet air and countercurrent to the exhaust flow of the air. Part of the drying takes place while the spray is passing through the ascending exhaust air and the drying is completed while the spray travels concurrently with the descending heated inlet air. The outlet air temperature of this type of dryer is in most cases considerably lower than for other types of dryers which increases the efficiency of treatment of thermally sensitive materials.

In FIG. 4 there is shown a vertical down-flow concurrent type spray dryer. The dryer 401 has a main dryer portion 402 and a product collection portion 403 discharging to a product collection reservoir. Heated air (which may be predried) is introduced into dryer 401 through inlet 404 and flows past a spray of solution to be dried. The spray of solution is ejected at right angles to the air flow through nozzle 405 which is supplied by conduit 406 from the solution supply tank. The spray of solution being treated is shown by dotted lines and arrows 407 while the general path of heated air flow is shown by solid lines and arrows 408.

The heated air envelops the spray of material being dried and causes water to evaporate rapidly to produce a finely divided dried product. The solid product is removed in the separation portion of the dryer and the air is withdrawn from the dryer through outlet conduit 409 shown in dotted lines.

In FIG. 5 there is shown a vertical up-flow countercurrent type of spray dryer. Dryer 501 includes a dryer portion 502 and a collector portion 503. Dryer 501 is divided with inlets 504 and 505 for supplying heated air (which may be predried) counter-currently to the spray of liquid being treated. The collector portion 503 has an outlet 506 discharging into a product collection receptacle 507.

At the upper end of dryer 501 there is provided an atomizing nozzle 508 having a supply inlet conduit 509. Nozzle 508 is arranged to discharge a plurality of atomized streams of liquid as shown by dotted lines and arrows 510. At the upper end of the dryer there is provided an outlet opening 511 for withdrawal of gases from the dryer.

The vertical up-flow countercurrent type of dryer is quite efficient in drying but results in product classification. The larger particles which are dried by the air circulating through the dryer fall to the bottom of the chamber and are withdrawn into the product collection receptacle. Very fine particles are carried out through outlet 511 and require separation in a secondary separation system (not shown).

In FIG. 6 there is shown a diagrammatic view of a vertical up-flow concurrent type of spray dryer. In this apparatus dryer 601 comprises dryer chamber 602 having outlet 603 for discharge of air and outlet 604 discharging to a product collection receptacle 605.

Heated air (which may be predried) is introduced into the dryer through conduit 606 as shown by solid lines and arrows 607. The liquid product to be treated is introduced through conduit 608 and atomized at nozzle 609 as shown by dotted lines and arrows 610.

In this type of dryer both the air and the atomized liquid to be treated enter at the bottom of the chamber. The liquid is sprayed in a form of a hollow cone which is enveloped by the heated air flowing through the dryer. The air is maintained at a temperature ranging from 38° C. up to 482° C. depending upon the product being treated. The up-flow of air results in product classification as the large particles fall to the bottom of the chamber and are removed to product collection receptacle 605 while the product fines are withdrawn with the air through outlet 603. This arrangement requires the use of a secondary separator system for recovery of product fines and to prevent air pollution.

In FIG. 7 there is shown diagrammatically a horizontal concurrent type of spray dryer. Spray dryer 701 includes dryer chamber 702 having air inlet 703 and outlet 704 and product outlet 705.

The liquid being treated is introduced into the dryer through conduit 706 which atomizes the liquid through nozzle 707 in the form of a conical spray as indicated by dotted lines and arrows 708. The heated air (which may be predried) is introduced through inlet 702 and given a whirling motion by helical vanes 709.

In this type of dryer the liquid spray and air enter concentrically at the same end of the chamber. The air circulates around the spray of liquid particles in a whirling motion caused by helical vanes 709. The particles are quickly dried and settle to the bottom of the dryer where they are removed to the product collection receptacle 710. The air is withdrawn from the dryer through outlet 704. In this type of dryer the very fine product particles are carried out with the air and require a secondary separation system (not shown).

The following non-limiting examples are illustrative of several embodiments of this invention:

Example 1

A commercial viscose solution is purified by a batch dialysis technique and converted to a decausticized, dry, stable powder by spray drying.

The viscose used is a commercial viscose solution, ripened, and ready for extrusion and containing about 8% cellulose, 6.6% total alkali (total of free sodium hydroxide and combined sodium in the cellulose xanthate), 1.10% xanthate sulfur, and having a D.P. of about 500 (D.P. is the degree of polymerization and represents the average number of anhydroglucose groups per cellulose molecule).

The viscose is diluted to a 4% cellulose content and 600 ml. of the dilute viscose is placed in a bag of regenerated cellulose film. The dialysis bag which is used in this example consists of a 72 in. length of 0.8 in. diameter tubing of regenerated cellulose film, tied at both ends. The bag of diluted viscose is placed in a 9-liter bottle and the bottle filled with distilled or deionized water. The bottle is shaken for about 20 min. at 15° C. on an Eberbach shaker at 150 cycles per min. The water is decanted and the bottle again filled with fresh water and shaken for a 1-hr. period at 15° C. After two additional changes of water the dialysis is complete.

At this point, the dialyzed viscose is removed from the bag and diluted to a 2% cellulose content to produce a viscous liquid having a pH of 11.

The dialysis procedure is repeated several times until 5 gallons of 2% cellulose content, decausticized (pH 11), viscose is obtained. The decausticized viscose is fed through a mixed flow spray dryer as shown in FIG. 3. The solution is atomized into the dryer and contacted with a high velocity heated air. In this drying operation the air inlet temperature is 130° C. and the air outlet temperature is 60° C. The rapid drying of the atomized droplets of decausticized viscose results in the production of a dry powder having a water content less than 5%. The individual particles are in the form of hollow spheres and range from submicron size up to a few balloons of 30 to 60 microns in diameter. The average size of the hollow spheres is about 10 microns. The product which is obtained has a xanthate sulfur content of about 12.5% on cellulose and a D.P. which is substantially the same as the viscose feed stock. The dry powdered product is stable against xanthate decomposition for several days at room temperature and almost indefinitely when refrigerated to 0° C. The product has a pH less than 13 when dissolved or dispersed in water at 1% concentration and a D.S. greater than 3%.

In this example aged or ripened viscose was used. In other experiments unaged or unripened, blender viscose was used with similar results. In fact, when blender viscose is used, both the feed and product xanthate sulfur contents are higher and the product more easily redissolved in water. If desired, the process can be carried out with specially prepared high xanthate viscose, having a xanthate D.S. in the range from 50 to 100% (i.e., 1.5 to 3.0 xanthate groups per anhydroglucose unit).

Example 2

In another experiment, the dialysis of viscose was carried out using an acid form cation exchange resin to maintain a high concentration gradient through the dialysis membrane to reduce the quantities of water required for the dialysis. A 60-in. long tube of regenerated cellulose was tied at one end to form an elongated bag. At the end of the bag was placed about 20 g. Amberlite I.R.C. 50 H (a carboxylic exchange resin in the acid form) and 50 ml. of water. The casing was then tied and additional amounts of water and ion exchange added and the bag again tied. This arrangement was repeated until a string of five batches of resin and water were obtained. This dialysis membrane containing acid form cation exchange resin beads was then placed in a wide mouth bottle containing 500 g. of viscose having a 4% cellulose content, produced by dilution of 8% cellulose content commercial blender viscose. The bottle was stoppered and shaken at 320 cycles per min. for 2½ hrs. The shaker bed was maintained at a temperature of about 32° C. When the dialysis was complete, the dialysis membrane was removed from the bottle and the decausticized viscose solution which remained had a pH of 11.4. The dialyzed viscose which was thus produced was a viscous liquid of just barely pourable viscosity. The increase in viscosity was partially caused by decausticization but was also due to a ripening of the diluted viscose as a result of being held at a temperature of 32° C.

The procedure just described is repeated and the product diluted to produce about 5 gallons of 2% cellulose content solution. The decausticized viscose solution is fed into a concurrent down flow type spray dryer as shown in FIG. 4. The decausticized viscose is atomized into the dryer and mixed with heated air. The air inlet temperature is 146° C. and the outlet temperature 107° C. As previously described, the evaporation of water from the atomized droplets of viscose maintains the surface temperature of the droplets sufficiently low to prevent excessive decomposition of the cellulose xanthate.

The product which is obtained is a finely divided, dry (moisture content less than about 5%), stable, solid. The individual particles are spherical in shape and have an average diameter of about 10 microns. The product has a xanthate sulfur content of about 15% on cellulose and is easily dissolved in water. This product is stable for several days at room temperature and almost indefinitely under refrigeration.

The solid, stable, finely divided sodium cellulose xanthate produced in Examples 1 and 2 is easily dissolved in water to produce a solution which can be used for a variety of purposes. The reconstituted solution can be regenerated as a film or filament by conventional acid treatment or by thermal decomposition. The solution is very effective as an adhesive for wood or paper and as a wet or dry strength additive for paper.

About three drops of the reconstituted sodium cellulose xanthate solution (2% cellulose content) are applied per foot of 0.4 in. wide seam along one edge of a length of 14.5 lb. hemp paper. The paper is formed into a cylinder with the cellulose xanthate solution functioning as an adhesive. The seam which is formed is dried by heating for a time sufficient to cause the cellulose xanthate to decompose into regenerated cellulose. The seam has a re-wet shear strength in excess of 10 lbs./linear inch of seam.

Example 3

In this and subsequent examples, the preparation of various spray dried polymeric alcohol xanthates is described.

A high purity amylose (derived from corn) containing about 10% water and having a D.P. of about 700–900 is used in the formation of an alkali amylose xanthate solution similar to viscose.

An alkaline solution of 24% concentration (1580 g. water and 300 g. sodium hydroxide) was prepared and mixed with 300 ml. methanol and 150 g. amylose. The slurry which was formed was stirred for 10 min. and 200 ml. additional methanol added, and the more dilute slurry stirred for 1 hr. at 25° C. At that time, 5.1 liters of methanol were added to precipitate and shrink the amylose. The supernatant layer was decanted and found to contain 270 g. of sodium hydroxide. The gel which remained was allowed to dry in thin layers and to depolymerize or age.

The alkali amylose which was produced was dried and aged for 43 hrs. at 25° C. to permit the preparation of relatively high concentration alkali amylose xanthate solutions. The gel weight was about 870 g. and comprised 12.6% alkali, 16% amylose, and 71% water.

The alkali amylose (870 g.) was spread on the bottom and on the porcelain plate of a 12 in. vacuum desiccator. Nitrogen purging was carried out and a vacuum then applied. About 70 g. of carbon disulfide were drawn into the desiccator and the system allowed to stand in a water bath at 25° C. After about 5.25 hrs., the alkali amylose had turned to a carrot yellow-orange color. The vacuum was applied to the desiccator to remove excess carbon disulfide for a period of about 20 min. The product obtained consisted of 898 g. of sodium amylose xanthate. This material was refrigerated at −20° C. for 6 days before solutions were prepared from it.

A solution was prepared by mixing the sodium amylose xanthate with an equal weight of water for 2 hrs. using a 2½ in. marine type propeller as an agitator. The mixture was maintained at a temperature less than 15° C. during solution. The viscous xanthate solution was filtered through a muslin filter cloth and had a 6% alkali content (both free sodium hydroxide and combined sodium) and 8% amylose.

The amylose xanthate solution was diluted to a 2% amylose content and was decausticized by dialysis. The dialysis was carried out using the procedure described in Example 1 and produced a decausticized solution having a pH of 11.5.

A 2% decausticized solution of amylose xanthate, prepared as described above, is fed to a down-flow counter-current-type spray dryer as described and shown in FIG. 5 of the drawings. The amylose xanthate solution is sprayed into the dryer counter-currently to the flow of heated air. The air has an inlet temperature of 149° C. and an outlet temperature of 104° C. The air stream passing out from the dryer is passed through a secondary separation system for recovery of fines which are combined with the coarser product removed from the bottom of the spray dryer. The product which is produced consists of a stable, dry, solid comprising essentially decausticized sodium amylose xanthate. The product consists of very small, hollow spheres ranging from submicron size up to balloons in the range of 30 to 60 microns in diameter and has an average particle size in the range of 5 to 20 microns.

This product has a xanthate sulfur content equal to about 75% of the xanthate sulfur content of the feed solution. The amylose xanthate powder is easily dissolved in water to produce viscous solutions which are useful in the formation of regenerated amylose films and fibers. The reconstituted amylose xanthate solutions are also useful as adhesives for wood and paper and as wet and dry strength additives for paper. The powdered amylose xanthate product is stable for extended periods of time. If the powder is given an additional drying with extremely dry air at room temperature or by admixture with a desiccant material to reduce the water content to substantially zero there is substantially no loss of xanthate sulfur during storage at room temperature for several months.

Example 4

In this example, dilute sodium polyvinyl alcohol xanthate is decausticized and converted to a dry stable powder.

The sodium polyvinyl alcohol xanthate used in this example is prepared in accordance with the procedure of B. G. Ranby, described in Die Makromolekulare Chemie, November 1960, p. 68 ff. The sodium polyvinyl alcohol xanthate is diluted to a 2% polyvinyl alcohol content and purified by dialysis following the procedure described in Example 1. The dialyzed solution is a viscous liquid of pH 11.

The decausticized solution of sodium polyvinyl alcohol xanthate is then passed through a concurrent up-flow spray dryer as described and shown in FIG. 6. The solution is atomized into the dryer into a stream of heated air. The air has an inlet temperature of about 163° C. and an outlet temperature of 104° C. Under these conditions the spray is converted to a finely-divided dry powder and recovered in the product collection system.

The sodium polyvinyl alcohol xanthate powder consists of hollow spherical particles ranging from submicron size to balloons having diameters of the order of 30 to 60 microns. The powder is stable on extended storage and is easily redissolved in water. A reconstituted solution of decausticized sodium polyvinyl alcohol xanthate is a viscous liquid which can be regenerated as a film or fiber and which is useful as an adhesive or as a wet and dry strength additive for paper.

Example 5

In this example, dilute sodium polyallyl alcohol xanthate is decausticized and converted to a dry stable powder.

The sodium polyallyl alcohol xanthate used in this example is prepared in accordance with the procedure of B. G. Ranby, described in Die Makromolekulare Chemie, November, 1960, p. 68 ff. The sodium polyallyl alcohol xanthate is diluted to a 2% polyallyl alcohol content and purified by dialysis following the procedure described in Example 1. The dialyzed solution is a viscous liquid of pH 11.

The decausticized solution of sodium polyallyl alcohol xanthate is then passed through a horizontal concurrent flow type dryer described and shown in FIG. 7. The solution is atomized into the dryer into a stream of heated air. The air has an inlet temperature of about 163° C. and an outlet temperature of 104° C. Under these conditions the spray is converted to a finely divided powder and recovered in the product collection system.

The sodium polyallyl alcohol xanthate powder is finely divided and consists of hollow spherical particles ranging from submicron size to balloons having diameters of the order of 30 to 60 microns. The powder is stable on extended storage and is easily redissolved in water. A reconstituted solution of decausticized sodium polyallyl alcohol xanthate is a viscous liquid which can be regenerated as a film or fiber and which is useful as an adhesive or as a wet and dry strength additive for paper.

SPRAY DRYING OF XANTHATE SOLUTIONS DECAUSTICIZED BY CATION EXCHANGE

Viscose and analogous polymeric alcohol xanthates solutions can be purified and reduced in pH by treatment with cation exchange materials in the hydrogen ion or acid form. The free alkali in viscose (and related polymeric alcohol xanthate solutions) and a substantial portion of the combined alkali can be removed by neutralization with a cation exchange material in the hydrogen ion or acid form. In general, the reaction is carried out by merely mixing the viscose (or other xanthate solution) with the cation exchange resin which results in a rapid reaction removing most of the basic impurities.

Reaction which takes place is a simple neutralization reaction, is quite rapid, and seems to be limited only by the rate of diffusion of the alkali into contact with hydrogen ions diffusing from the ion exchange material. While the process is most effective when used with commercially-obtainable, high capacity ion exchange resins, it is effective to a substantial degree with any material having cation exchange properties, which material can be converted to the acid form by treatment with acid. In general, the neutralization of free alkali (and part of the combined alkali) in polymeric alcohol xanthate solutions can be carried out using cation exchange materials in a definite and predetermined manner with the result that the pH of the resulting material can be calculated in advance by an evaluation of the stoichiometry of the reaction.

The following ion exchange materials are illustrative of the cation exchangers which can be used in this process: sulfonated phenolic resins, e.g., Zeo-Karb 215, Zeo-Karb 315, Amberlite IR 1, Amberlite IR 100, Duolite C 10, Duolite C 3, Dowex 30; sulfonated polystyrenes, e.g., Zeo-Karb 225, Amberlite IR 120, Duolite C 20, Dowex 50, and Nalcite HCR; sulfonated coal, e.g., Zeo-Karb H 1; nuclear substituted phosphonate resins, e.g., Duolite C 60 and Duolite C 61; carboxylic resins, e.g., Zeo-Karb 216, Zeo-Karb 226, Amberlite IRC 50, Duolite CS 100; acid treated zeolites; naturally occurring non-resinous ion exchange materials, e.g., cellulose, wood fibers (bast fiber) including fabricated forms thereof such as webs, papers, fabrics, and the like. The reference to ion exchange resins is intended to be generic to ion exchange material of the high capacity resinous type, to liquid ion exchangers, and to naturally occurring non-resinous materials such as acid treated coal, cellulose wood fibers, fabrics, webs, papers, and the like which are known to have cation exchange properties.

When polymeric alcohol xanthate solutions are treated with ion exchange materials to neutralize free alkali (and sometimes part of the combined alkali) the resulting solution has a pH less than 13 and is capable of being spray dried as will be subsequently described. When a polymeric alcohol xanthate solution is decausticized to a pH less than about 9 some of the combined alkali is removed and the resulting product contains some acid xanthate groups. Consequently, when the product solution or the ultimate spray dried powder is referred to as a polymeric alcohol xanthate, the term is intended to be inclusive of acid xanthates (sometimes referred to as xanthic acids) of the specified polymeric alcohol in which some or all of the combined alkali has been removed.

The following non-limiting examples are illustrative of the preparation of stable, dry powders of polymeric alcohol xanthates by spray drying of xanthate solutions which have been neutralized or decausticized by cation exchange.

Example 6

An 8% cellulose content viscose, as used in Example 1, was diluted with distilled water to a 0.5% cellulose content. Amberlite IRC 50H resin beads were added intermittently to the diluted viscose with mechanical stirring over a period of about 10 min. at 25° C. until the pH reached a value of about 8. A clear, light-amber colored liquid resulted. The liquid was filtered through a muslin filter cloth and had a viscosity of 5.1 cps. at high shear rates and 7.8 cps. at low shear rates.

The decausticized viscose, prepared as described above, is fed into a spray dryer of the type described and shown in FIG. 1 of the drawings. The solution is atomized into a stream of hot air and rapidly converted into a dry stable powder. The air is supplied to the dryer at an inlet temperature of 144° C. and an outlet temperature of 104° C.

The product obtained from the spray drying operation is substantially dry (moisture content less than about 3%), stable sodium cellulose xanthate (including some xanthic acid groups). The xanthate sulfur content of the product is about 75% of that of the feed to the dryer. The drying operation results in a very slight loss of xanthate sulfur but produces a dry, stable powder which can be stored for extended periods of time at room temperature and almost indefinitely under refrigeration. The sodium cellulose xanthate powder is easily redispersed in water to form a sodium cellulose xanthate solution from which films or fibers can be regenerated or which may be used as an adhesive or a wet or dry strength additive for paper.

Example 7

In an additional series of experiments, viscose containing higher proportions of cellulose was treated with a cation exchange resin by passing the viscose through a column of resin designed for pressure operation. The column consisted of a 2 in. (O.D.) x 30 in. stainless steel tube provided with end caps having O-ring seals and 100 mesh stainless steel screens backed by 14 mesh screens for supporting the resin bed. In using the column, coarse glass wool was first placed over the screen and the bottom of the column. A portion of Amberlite IRC 50H resin was pretreated with water to prevent excessive compacting of the resin due to swelling on initial wetting. The moist resin was added to the column and tamped to minimize channelling during the ion exchange reaction.

In one experiment the column was partially filled with 150 g. of Amberlite IRC 50H resin. 600 g. of 2% cellulose content viscose were added to the column. The pressure on the column was gradually increased to 30 p.s.i.g. over about 5 min. 600 g. of decausticized viscose were eluted from the column in 3 min. after the pressure reached 30 p.s.i.g. The initial effluent from the column had a pH of 5.5. The final effluent from the column had a pH of about 8.4 which increased to 9.0 after about 4 hours' storage.

In another experiment the column was charged with 100 g. of Amberlite IRC 50H covered with a 0.75 in. layer of Amberlite IRC 50Na. Next, 547 g. of 3% cellulose content viscose were introduced to the column and a pressure of about 60 p.s.i.g. applied. At the end of about 30 minutes, 540 g. of the viscose had been recovered. The initial effluent from the column had a pH of 5.0 which rose to 8.5 after the first 50 ml. The pH of the viscose remained at about 8.5 until completely eluted from the column and gradually increased to a value of 9.8 after about 3 hrs. at 25° C.

In another experiment a column was charged with 100 g. of Amberlite IRC 50H covered with a 0.5 in. layer of Amberlite IRC 50Na. Then 700 g. of 2.5% cellulose content viscose were added to the column and a pressure of 55 p.s.i.g. applied. The entire 700 g. of viscose were eluted from the column in about 4.5 min. and had a pH of 12.5.

In other experiments, dilute viscose solutions (0.5% cellulose content) were passed through the column under gravity feed and under various pressures to produce decausticized viscose solutions of pH varying from 5 to 10.

Decausticized viscose solutions, prepared as just described, are spray dried using the apparatus described and shown in FIG. 1 of the drawings. The viscose solution, in each case, is atomized into a stream of heated air. The air stream has inlet temperature of about 149° C. and an outlet temperature of about 104° C. As previously described, the evaporation of water from the individual droplets of solution maintains the surfface temperature of the droplets (and the resulting solid particle) at a temperature not substantially in excess of the wet bulb temperature of the gas stream. The spray drying of the decausticized viscose solutions produces finely divided powders of sodium cellulose xanthate. The powder is a dry (moisture content less than about 3%) stable, solid material in the form of hollow spheres having diameters ranging from submicron size up to 60 microns in diameter. The dry solid product is stable for several days at room temperature and almost indefinitely under refrigeration. If the dry powder is dried further to remove substantially all of the water, the product can be stored almost indefinitely at room temperature.

The sodium cellulose xanthate powder produced as just described is easily dissolved in water to reconstitute a decausticized viscose solution. The solution thus prepared is useful as an adhesive for paper or wood and as a wet or dry strength additive for paper.

Example 8

In another experiment, a 0.8% cellulose content viscose was mixed with Dowex 50 WX8 sulfonic acid type resin in the hydrogen ion or acid form. The mixture was stirred for a few minutes and the decausticized solution recovered. The solution had a pH of 11.5 and did not coagulate or gel after storage for 24 hrs. at room temperature.

When this solution is spray dried as described in the previous example, a solid stable powder is obtained which is easily redissolved in water at the time and place of intended use.

Example 9

The composition of viscose (or similar polymeric alcohol xanthate solutions) which has been decausticized by cation exchange cannot be simply defined. The viscose starting material contains at least ten types of molecular species, many of which are in transient equilibrium. Ion exchange will, in general, shift these equilibria to give the free acids. The nature of the products also depends somewhat upon the speed of the ion exchange reaction or the contact time with the resin. This is because of the fact that, while the free sodium (or other alkali) ions in the viscose are being neutralized by the ion exchange to produce cellulose xanthic acids (also called cellulose acid xanthates), the resulting product will hydrolyze to produce additional amounts of free alkali. However, this hydrolysis takes time and the composition of the resulting product, therefore, varies somewhat with the time required for the neutralization or ion exchange reaction. The composition of the decausticized viscose also depends to some extent upon the time that it has been stored.

In a series of experiments, a 0.5% cellulose content viscose was neutralized or decausticized by treatment with Amberlite IRC 50H resin and samples obtained in a pH range from 9.3 down to 6.5.

Analysis of the decausticized viscose having a pH of 6.9 showed that the composition contained about 57% of its xanthate content in the form of acid xanthate groups. At a pH of 7.3 the viscose contained 56% of its xanthate content in the form of acid xanthate groups. Viscose which was decausticized to a pH of 8.1 was found to contain 17% of its xanthate content in the form of acid xanthate groups. On the other hand, viscose which was decausticized to a pH of 9.3 contained no free acid xanthate groups.

When the decausticized viscose samples taken at various pH levels are spray dried in the dryer described and shown in FIG. 1 a stable, solid sodium cellulose xanthate powder is obtained.

In each case there is a slight loss in xanthate sulfur content of the product relative to the feed. This results from a partial decomposition of the xanthate. The viscose samples which correspond to viscose having all free alkali removed (pH of about 9.3) are spray dried most efficiently with a minimum decomposition of the xanthate. Viscose which has been neutralized to a lower pH is somewhat less stable and is preferably dried using higher velocity and lower temperature air. Viscose samples which have been neutralized to a pH in the range from 9.3 up to 13 are progressively less stable, with increasing pH of the solution, during the spray drying process. This is unexpected since the opposite is true with respect to the neutralized solutions. The solutions decrease in stability with decrease in pH below pH 13.

In this range (pH 9–13), there is a more severe loss of xanthate sulfur. Nevertheless, with proper selection of temperature and air velocities in the spray dryer, spray dried products can be produced which are solid, stable and easily redissolved. Viscose, and other polymeric alcohol xanthate solutions having a pH above 13 cannot be spray dried without almost total loss of xanthate sulfur. In fact, attempts to dry viscose and other polymeric alcohol xanthates having a pH above 13 results in almost total regeneration of the cellulose or other polymeric alcohol therefrom. In such a case, the powdered product which is produced cannot be redissolved or redispersed and is lacking in all of the desirable properties found in the spray dried decausticized product.

Example 10

This example demonstrates that naturally occurring organic ion exchange materials can be used with substantially equal success in decausticizing viscose in preparation for drying.

An 8% cellulose content viscose as used in Example 1 was diluted to a 0.3% cellulose content with distilled water. The diluted viscose was slurried with bast fibers which had been acid treated to convert the ion exchange sites therein to the acid or hydrogen ion form. At the end of 10 min., the slurry was filtered and the dilute viscose was recovered as a light amber colored solution of cellulose xanthate having a pH of about 9.0.

The decausticized viscose thus prepared is fed into a spray dryer as shown and described in FIG. 1. In the dryer the viscose is atomized and passed into a stream of heated air. The air has an inlet temperature of 143° C. and an outlet temperature of 104° C.

The viscose spray is completely dried to produce a finely divided solid product which is stable on extended storage. The product is sodium cellulose xanthate in the form of hollow spheres ranging from submicron size up to balloons in the range of 30 to 60 microns in diameter.

Example 11

A series of experiments were carried out in spray drying decausticized viscose under a variety of feed conditions.

Viscose having a 7.7% cellulose content was decausticized to various pH levels using Amberlite IRC 50 ion exchange resin in the acid or hydrogen ion form. The decausticized viscose was diluted to a 2% cellulose content to facilitate feeding into spray dryer. The results of spray drying the various samples are set forth below in Table I:

TABLE I

| Run No. | Type of spray dryer | Feed pH | Air inlet temp., ° C. | Air outlet temp., ° C. |
|---|---|---|---|---|
| 1 | Fig. 1 | 12.3 | 116 | 60 |
| 2 | Fig. 1 | 10.3 | 116 | 60 |
| 3 | Fig. 1 | 9.6 | 116 | 60 |
| 4 | Fig. 1 | 6.5 | 116 | 60 |

The spray dried powders obtained in each of the above runs contained about 65% cellulose and about 4% water. The product is a yellow to greenish-yellow free flowing powder which is stable for several weeks at room temperature. Under refrigeration the powder is stable almost indefinitely. The sodium cellulose xanthate powder is very hydroscopic and must be protected against atmospheric moisture. The powders were further dried using various laboratory desiccants to reduce the water content to less than 2%. Extensive drying with bone-dry air has reduced the water content of the product to substantially less than 1%. The stability of the product is closely related to the water content. The product tends to lose xanthate sulfur in the presence of moisture. The extremely dry product has a storage life of at least 6 months at room temperature. In fact, the totally anhydrous product is stable even at moderately elevated temperatures for extended periods of time.

When various solid extender materials are mixed into the decausticized viscose prior to spray drying the resulting product consists of particles of solid cellulose xanthate dried on nuclei formed of the extenders. Pigments, sizing agents, dyes, antistatic agents, clays, etc., can be admixed with the decausticized viscose feed to produce a spray dried product containing the extender material. Kaolin clays have been mixed with decausticized viscose at clay:cellulose ratios of 0.5–2.0 to 1.0 and spray dried. The solid product was redispersed and/or dissolved in water and used to coat paper with no loss in strength relative to paper coated with the same cellulose loading but containing no clay. Likewise, the spray dried product may be admixed with pigments, buffers, anti-oxidants, sizing agents, dyes, anti-static agents, desiccants, cross linkers for cellulose, solid acids and the like.

Example 12

A series of experiments were carried out in which decausticized viscose was spray dried in the apparatus described and shown in FIG. 2 of the drawings.

Viscose having a 7.7% cellulose content was diluted to a 2% cellulose content and decausticized with a cation exchange resin in the acid form as described in the previous example. Various samples of decausticized viscose having a pH range from 9 to 12 were spray dried. The apparatus was operated at inlet temperatures varying from 146° to 204° C. and outlet temperatures varying from 107 to 135° C. The dilute decausticized viscose was sprayed under an atomizing pressure of 3000–4500 p.s.i.g. at a flow rate of 60–120 gallons/hr. The drying air was circulated through the dryer of at a flow rate of 4500–5000 standard cubic ft./min.

Under these conditions, products were obtained having a residual moisture content of about 1.3–3.0% and xanthate sulfur content equal to about 75% of the xanthate sulfur content of the feed. It was found that decausticized viscose feed stocks having a pH substantially in excess of 9.0 are more sensitive to temperature and must be dried under more carefully controlled conditions. At a pH of 10 to 13 the dilute decausticized viscose should be spray dried at a minimum temperature consistent with substantially complete removal of water. In general, temperatures of the order of 104–121° C. are satisfactory, although higher temperatures can be used at higher air flow rates provided that the dried product is quickly removed from the heated air stream.

In the several experiments carried out in the spray drying of decausticized viscose, it was found that relatively dilute (2 to 3% cellulose content) solutions should be used in spray dryers using atomizing nozzles. Higher concentrations (e.g., up to 5–6% cellulose content) may be used but are difficult to handle in the spray dryer because of very high viscosity. In spray dryers which use centrifugal atomizers, it is possible to use feed stocks having much higher solid contents. Also, it is possible to use more viscous higher solids content solutions where high presure nozzle, e.g., 500–5000 p.s.i., can be used.

The D.P. of the cellulose in the viscose is not a critical factor although high D.P. cellulose viscoses have substantially higher viscosities and are somewhat more difficult to handle. The D.S. of the viscose likewise is not critical but a very high D.S. viscose feed stock will yield a higher D.S. spray dried product which is more soluble or dispersible in water or other solvents (e.g., dimethyl sulfoxide, dimethyl formamide, etc.).

The optimum conditions for spray drying all types of decausticized viscose and other polymeric alcohol xanthate solutions have not been completely determined. In general, however, the spray dryer should be operated at an air temperature ranging from 38° up to as high as 482° C. at the inlet and an air outlet temperature of 38°–

149° C. The flow rate of the air stream may be adjusted relative to the feed rate of solution being dried and related to the collection efficiency of the cyclone collectors or other collection system so that the dried product is rapidly removed from the heated air stream.

The pH of the feed material is relatively critical. It is absolutely necessary that a pH of less than 13 be used. In general, the pH of the solution should approximate the pH of the solution of the pure alkali polymeric alcohol xanthate salt in distilled water. Higher and lower pH feed stocks may be used in the range from about 4 to 13 although feeds having a pH substantially below or above the equilibrium pH of the xanthate salt solution require more care in handling to prevent excessive loss of xanthate sulfur in the spray dryer.

Under the conditions investigated, it is possible to produce dried products having a moisture content in the range from about 1.0 to 10%. Under more severe conditions of drying the moisture content can be reduced to below 1.0%. If it is desired to reduce the moisture of the content further, the product may be treated with desiccants or dried using bone-dry air at room temperature or below. The product which is obtained in each case is a dry, stable, solid, decausticized polymeric alcohol xanthate. The product has a D.S. of at least 3% and in most cases has a D.S. in the range from 25 to 75%. There is a very small loss in D.P. of cellulose during spray drying or on extended storage. This loss may amount to about 10% maximum and can be overcome by incorporation of an anti-oxidant into the powder either before or after spray drying. As previously noted, the powdered product may be mixed with powdered materials such as pigments, dyes, desiccants, anti-oxidants, coloring agents and the like which may be inert or which may be reactive enough that they could not be added to an aqueous solution of the xanthate salt. Thus, potential cross linkers or even solid acids can be mixed with the powder so that they do not become active until the whole system is wet with water.

Example 13

An 8% amylose content solution of sodium amylose xanthate is prepared as described in Example 3 and diluted to a 2% amylose content. This solution is mixed with Amberlite IRC 50H resin to neutralize and decausticize it. The solutions which are recovered have a slight greenish cast but are otherwise similar to decausticized viscose. Decausticized sodium amylose xanthates are produced in this manner at pH values of 10.5, 9.5, 8.7, 8.4 and 7.6. The decausticized sodium amylose xanthate tends to hydrolyze and increases slightly in pH on extended storage. After about 17 hrs. storage the increase in pH is only slight and an equilibrium pH of about 10–10.5 is reached after only several days of storage. When sodium amylose xanthate solutions are decausticized to a pH less than 7 the amylose xanthate contains a substantial proportion of its xanthate content in the form of acid xanthate groups.

Decausticized solutions of sodium amylose xanthate prepared as described above are spray dried in the spray dryer described and shown in FIG. 2 of the drawings. The solutions are atomized into a stream of heated air having an inlet temperature of 143° C. and an outlet temperature of 102° C. The product obtained is a dry, stable, decausticized sodium amylose xanthate powder. A similar product is obtained when alkaline sodium amylose xanthate solutions are decausticized with other exchange resins such as Duolite C60, or Zeo-Karb 226 resin in the acid form, followed by spray drying.

Example 14

A dilute solution of sodium polyvinyl alcohol xanthate is prepared as described in Example 4. This solution is decausticized to a pH of 8.0 by admixture with Amberlite IRC 50H resin in the acid or hydrogen ion form. The decausticized solution is spray dried in the apparatus described and shown in FIG. 2 as described in the previous example. The product is a dry stable powder of sodium polyvinyl alcohol xanthate and is easily dissolved or dispersed in water.

Example 15

Sodium polyallyl alcohol xanthate solution is prepared as described in Example 5. The dilute solution is decausticized by admixture with Amberlite IRC 50H exchange resin in the acid or hydrogen ion form. The solution is decausticized to a pH of about 8. The decausticized solution is spray dried in the apparatus described and shown in FIG. 2 of the drawings. The conditions of spray drying are as set forth in the previous example. The product obtained from the dryer is a stable, solid powder of sodium polyallyl xanthate. This powder is stable for extended periods of storage at room temperature and is easily dissolved or redispersed in water.

SPRAY DRYING OF POLYMERIC ALCOHOL XANTHATE SOLUTIONS DECAUSTICIZED BY ANION EXCHANGE

Viscose and similar polymeric alcohol xanthate solutions can be purified and decausticized by treatment with anion exchange material in a manner somewhat similar to the purification and decausticization using cation exchange resins. In the anion exchange treatment the material used is a strong-base or intermediate-base strength anion exchange resin in the salt form (non-hydroxyl form). When the viscose (or other xanthate) solution is contacted with an anion exchange resin in the salt form, the hydroxyl groups in the solution exchange with the ionizable salt groups on the resin. If the viscose solution is merely mixed with anion exchange resin, the hydroxyl groups from the solution will reach equilibrium with the salt groups ionized from the resin and there will be only a partial purification and decausticization of the solution. However, if the viscose (or other polymeric alcohol xanthate solution) is fed through a column containing the resin, a relatively high ion concentration gradient is maintained between the solution and the resin with the result that a substantially complete removal of hydroxyl ion from the solution is effected.

When an anion exchange resin is used in this manner for decausticizing viscose (or other polymeric alcohol xanthate solutions), it is effective not only to remove hydroxyl ions from the solution but also to remove the anions of contaminating by-products such as trithiocarbonates, mono and dithiocarbonates, thiosulfates, perthiocarbonates, and sulfides which are produced as by-products in the xanthation process.

The treatment of viscose and similar solutions with anion exchange resins has the advantage of removing ionic by-products which tend to discolor the viscose but has the disadvantage of substituting the anion of the ion exchange resin for the hydroxyl ions in the solution with the result that the decausticized viscose contains an amount of sodium salts which is substantially equivalent to the alkali content of the viscose as initially formed. As a result, it is necessary to use anion exchange resins only in the form of salts of relatively strong acids so that the salt formed with the sodium ions is substantially neutral. In practice, the anion exchange process is preferably used to clean up a solution which has first been dialyzed or neutralized by cation exchange.

In carrying out the decausticization of polymeric alcohol xanthate solutions with anion exchange materials, any of the commercially available anion exchange resins can be used as well as naturally occurring materials which inherently possess anion exchange properties. Examples of anion exchange materials that can be used in the decausticization of polymeric alcohol xanthate solutions by anion exchange include but are not limited to the following: interemediate base anion exchangers, e.g. Dowex 2; strong base anion exchangers, e.g., De-Acidite FF, Amberlite IRA 400, Amberlite IRA 410, Dowex 1, Nalcite SAR; porous anion exchangers, e.g., Decolorite and Duolite S30, as well as naturally occurring anion exchangers, e.g., proteins containing ionizable amino groups, polymeric betaines, etc.

The following non-limiting examples are illustrative of the decausticization of polymeric alcohol xanthates by anion exchange:

Example 16

A glass column having an I.D. of 1 cm. was filled to a depth of 20 cm. with 50 mesh Dowex 1×4 ion exchange resin in the chloride form.

An 8% cellulose content viscose was diluted to 0.5% cellulose content and fed through the column under a pressure of 0.5 p.s.i.g. at a rate of 1 ml./min. The effluent from the column had a substantially contant pH of 11.8 and was a clear, colorless liquid.

This procedure was repeated using the same apparatus filled with Dowex 1×8 resin in the chloride form and the product was a clear liquid having a substantially constant pH of 11.8.

The causticized viscose produced as just described is fed through a spray dryer as shown and described in FIG. 1 of the drawings. The solution is atomized into a heated air stream having an inlet temperature of 115° C. and an outlet temperature of 60° C. The product obtained is a dry stable almost white powder comprising sodium cellulose xanthate containing a small amount of sodium chloride.

When dilute viscose was passed through an anion exchange column using other anion exchange resins, including Dowex 2×4 (chloride form), Amberlite IRA 400 (nitrate form), and Nalcite SAR (nitrate form), a decausticized product was obtained as described above.

When the decausticized product is sprayed dried, the resulting product is a dry stable white powder containing a small amount of a sodium salt impurity resulting from the introduction of the anion from the exchange resin. The anion exchange step is particularly effective in removing colored sulfur by-products. These colored by-products can also be removed by aeration of a cold solution which has been purified or decausticized by dialysis or cation exchange.

When the above procedure is repeated using solutions of sodium amylose xanthate, sodium polyvinyl alcohol xanthate, or sodium polyallyl alcohol xanthate, the solutions are readily decausticized and can be spray dried as described above.

SPRAY DRYING OF POLYMERIC ALCOHOL XANTHATE SOLUTIONS DECAUSTICIZED BY ION RETARDATION

Ion retardation resins constitute a new class of materials similar to ion exchange resins. They are prepared by polymerizing a cationic monomer inside the pores of an anion exchange resin or an anionic monomer inside the pores of a cationic exchange resin. The resulting linear polymer is trapped inside the cross linked ion exchange resin and cannot diffuse out. The resin system is physically and chemically stable and comprises a mixture of cation and anion exchangers with the mixing taking place at the molecular level.

In an ion retardation resin the ionic and cationic absorption sites are so closely associated that there is a partial neutralization of electrical charges in adjacent sites. However, the sites still have an attraction for mobile anions and cations and can associate with them to some extent. The result is that the resin will absorb both anions and cations from solutions with which it comes in contact, but the absorbed ions can be displaced from the resin by the use of water as an eluent. If the solution contains macromolecular ions, they cannot, in general, diffuse inside the resin beads, so a separation of small from large anions can take place. Ion retardation resins may be utilized in batch operations. However, since absorbed ions are only weakly held, their removal from solution is incomplete even in the presence of excess resin, and hence a column operation is generally preferred. In column operations, the solution to be treated is fed through the resin bed until the ion absorbing capacity of the bed is utilized as completely as possible. The absorbed ions are then eluted by rinsing the bed with water.

Example 17

In one experiment, a column of ion retardation resin was prepared using Retardion 11A8 (product of the Dow Chemical Company) which is a 50–100 mesh resinous material prepared by polymerizing acrylic acid inside Dowex 1 (a quarternary, strong base, styrene resin manufactured by the Dow Chemical Company). Before use, the resin was soaked in water to remove soluble impurities and to cause the resin to expand to its wet size. The preliminary washing of the resin is desirable to bring the resin bed to its full size and thus prevent variation in feed rate through the bed.

An 8% cellulose content (6% alkali) viscose was diluted to a 1% cellulose content for removal of alkali in the column. The dilute viscose was introduced into the top of the column and allowed to flow through by gravity. The eluent from the column had a pH of about 12 and was a clear colorless liquid. At a pH of 12, more than 99.9% of the free alkali in the viscose has been removed.

The recovery of the dilute viscose from the column was essentially quantitaive and the decausticized product, substantially free of impurities, could be thermally regenerated into a coating or film.

When this decausticized solution is fed into a spray dryer as described and shown in FIG. 1, a spray-dried product is produced which is stable over extended periods of time. The dilute solution is fed into the dryer through the atomizing nozzle into an air stream having an inlet temperature of 121° C. and outlet temperature of 60° C. The fine spray is quickly dried to produce a dry powder which is rapidly separated from the heated air before substantial decomposition of the xanthate can occur. The powder which is produced can be redissolved or redispersed in water or other substantially inert polar solvents and can be used as an adhesive for paper or wood or as a wet or dry strength additive in the manufacture of paper.

Example 18

A column of Retardion 11A8 resin is prepared as described in Example 17. An 8% amylose content solution of sodium amylose xanthate is prepared as described in Example 3 and diluted to a 1% amylose content solution. The dilute amylose xanthate solution is then allowed to flow by gravity through the resin bed. The effluent from the column has an average pH of about 12, which would represent substantially complete removal of all free alkali in the solution.

When this solution of decausticized sodium amylose xanthate is spray-dried using the dryer described and shown in FIG. 1 of the drawings, a fine powder is obtained which is stable for extended periods of time at room temperature and almost indefinitely under refrigeration. The product can be redissolved or dispersed in water or other inert polar solvent and used as an adhesive or a wet-dry strength additive in the manufacture of paper.

SPRAY-DRYING OF VISCOSE AND OTHER POLYMERIC ALCOHOL XANTHATE SOLUTIONS DECAUSTICIZED BY LIQUID ION EXCHANGERS

In some cases, the use of a liquid ion exchanger is advantageous in continuously decausticizing viscose (or other polymeric alcohol xanthate solutions) because the liquid exchange medium can be continuously removed and regenerated.

Example 19

A liquid ion exchanger was prepared by dissolving 20 g. of 5 monolauryl acid orthophosphate in 50 ml. of carbon tetrachloride. A turbid dispersion was produced. A 250 ml. beaker was charged with 100 ml. of dilute (0.5% cellulose content) viscose and the liquid ion exchanger slowly added with stirring.

As the materials were mixed, spontaneous emulsion took place and the pH decreased slowly to pH 9. The mixture was centrifuged to break the emulsion and decausticized viscose (pH 9) recovered as a clear, amber liquid.

When viscose which has been decausticized using a liquid ion exchanger as above described is fed into a spray dryer as shown and described in FIG. 1 of the drawings, a dry, stable powder is obtained. The solution is atomized into a heated air stream having an inlet temperature of 116° C. and an outlet temperature of 60° C. The dry powdered product is stable for extended storage at room temperature and almost indefinitely under refrigeration.

When the dry powder is redissolved to reconstitute a decausticized viscose solution, the resulting solution can be regenerated into cellulose film or fiber (by thermal or acid regeneration) and can be used as a high wet and dry strength size for paper.

The liquid ion exchange process used in decausticizing the viscose in preparation for spray-drying can be similarly used in the decausticizing of other polymeric alcohol xanthates. Other liquid ion exchangers (both anion and cation type), well known in the art can be used in this process.

SPRAY-DRYING OF VARIOUS POLYMERIC ALCOHOL XANTHATE SOLUTIONS DECAUSTICIZED BY VARIOUS MULTI-STEP PROCESSES

While the several processes of dialysis, cation exchange, anion exchange, ion retardation, etc., described above, are effective in decausticizing polymeric alcohol xanthate solutions, these processes are effective and in some cases more efficient when used in conjunction with one another. Thus, cation and anion exchange resins can be used for sequential treatment of various xanthate solutions, and mixtures of resins in the form of a mixed bed can similarly be used. Also, a combination of dialysis with cation or anion exchange is especially effective in decausticizing the various polymeric alcohol xanthate solutions. The decausticized solutions prepared by any such process can be spray-dried to produce exceptionally stable dry powdered materials.

Example 20

A 4% amylose-content, amylose xanthate solution was prepared as described in Example 3. About 100 g. of solution was placed in a regenerated cellulose bag and dialyzed by shaking the bag in 1.5 liters of water in a polyethylene bottle at 320 cycles per minute. The water was changed twice at 20-minute intervals; then it was changed again and the system left standing at 25° C. overnight.

The amylose xanthate solution was recovered from the dialysis bag as a viscose liquid having a pH of 11.5. The dialyzed solution (pH 11.5) recovered from the dialysis bag was mixed with Amberlite IRC 50H resin to remove additional sodium ions therefrom. The solution was separated from the exchange resin and found to have a pH of 6.5.

When the dialyzed and ion exchanged solution is spray-dried in the apparatus shown and described in FIG. 1, using an air inlet temperature of about 127° C. and an outlet temperature of 66° C., a stable, solid, dry powder is obtained.

When the spray-dried powder is redissolved, a reconstituted amylose xanthate solution (pH 6.5) is obtained which is quite viscous and can be regenerated to produce a film or filament by acid treatment or by thermal regeneration.

Example 21

A 1% cellulose content viscose was subjected to dialysis as described in Examples 1 to 3 to produce a decausticized product having a pH of about 12. The decausticized viscose was then mixed with a cation exchange resin, Amberlite IR 120H, to further remove sodium ions therefrom. The solution which was recovered from admixture with the resin was a viscous, light-amber-colored solution of decausticized cellulose xanthate having a pH of about 6.

When this decausticized cellulose xanthate is spray-dried as described in Example 20, a dry, stable powder is obtained. As previously described, the spray-dried powder may be redissolved to produce a solution which is useful in the preparation of regenerated cellulose films or fibers or as a wet or dry strength size for paper.

Example 22

A 1% cellulose content viscose is subjected to dialysis as described in Examples 1 to 3 to produce a decausticized product having a pH of about 12. The decausticized viscose is then mixed with a cation exchange resin, Zeo-Karb 226, to further remove sodium ions therefrom. The solution which is recovered from admixture with the resin is a viscous, light-colored solution of decausticized cellulose xanthate having a pH of about 6.

When this decausticized cellulose xanthate is spray-dried as described in Example 20, a dry, stable powder is obtained. As previously described, the spray-dried powder may be redissolved to produce a solution which is useful in the preparation of regenerated cellulose films or fibers or as a wet or dry strength size for paper.

Example 23

A 0.5% cellulose content viscose solution, freshly diluted, is fed through a column of Dowex 1×4 resin in the chloride form. A colorles effluent is recovered from the column having a pH slightly in excess of 12. The sulfur by-products in the viscose are removed in the form of a carrot-colored band near the top of the resin bed.

The effluent from the anion exchange column is then passed through a column containing Amberlite IRC 50H cation exchange resin to yield a colorless, odorless effluent. The solution recovered from the cation exchange column has an initial pH of 7.6.

When the pH 7.6 solution is spray-dried as described in Example 20, there is produced a stable, dry powder. This powder can be redissolved in water to produce a cellulose xanthate solution free of alkali and sulfur by-products which can be thermally regenerated or regenerated by acid treatment to produce films or fibers. The cellulose xanthate solution can also be used as a wet or dry strength additive for paper.

Example 24

A 1% cellulose content viscose solution, freshly diluted, is neutralized to pH 10 by admixture with Amberlite IRC 50H resin. The mixture is filtered to recover a fawn colored solution of cellulose xanthate.

The cation exchanged solution is then mixed with Dowex 1×4 anion exchange resin for a period of about 10 minutes. The solution which is recovered from the anion exchange resin is clear, colorless, and odorless, having a pH of about 10. The color-forming and odor-forming impurities are removed during the anion exchange treatment.

When the product solution is spray-dried as described in Example 20, there is produced a stable, dry, solid product. The dry powder which is produced is stable for extended periods of time at room temperature and almost indefinitely under refrigeration. As described in the previous examples, the spray-dried decausticized cellulose xanthate can be redissolved to produce solutions which are useful in the formation of films or fibers or as wet strength or dry strength additives for paper.

Example 25

In another experiment, a mixed bed ion exchange resin was prepared by mixing about 15 g. of Amberlite IRC 50H cation exchange resin with 13 g. of Dowex 1×OH anion resin. The mixed resin was added to 150 ml. of 1% cellulose content diluted viscose and stirred for ten minutes. The supernatant solution which was recovered was a clear, colorless solution having a pH of 7.2.

When this solution is spray-dried as described in Example 20, a dry, solid powder is obtained which is stable for extended periods of time at room temperature and almost indefinitely under refrigeration. As previously described, the spray-dried cellulose xanthate powder may be redissolved to produce a solution which can be used in forming regenerated cellulose films or fibers or as a wet or dry strength additive for paper.

USES OF DECAUSTICIZED POLYMERIC ALCOHOL XANTHATE POWDERS AND SOLUTIONS RECONSTITUTED THEREFROM

Decausticized viscose and other decausticized polymeric alcohol xanthates are useful for a variety of purposes for which the caustic materials would have little or no application. The decausticization of polymeric alcohol xanthate solutions reduces considerably formation of by-product materials upon regeneration of the polymeric alcohol as a film or fiber or for other suitable purposes. The decausticized polymeric alcohol xanthate solutions can be regenerated by treatment with acid as can the caustic or unpurified materials. The decausticized solutions, however, can be regenerated by treatment with acid to produce regenerated materials having a much smaller proportion of by-products than materials regenerated from the unpurified solutions. Furthermore, the decausticized xanthate solutions can be regenerated thermally to produce products which are largely free of by-product materials.

The decausticized solutions are somewhat unstable thermally and tend to gel upon storage for an extended period of time. When the solutions are spray-dried, as described above, the dry solid powder which is produced is stable at room temperature for extended periods of time and almost indefinitely under refrigeration. When the stable, solid, decausticized xanthate powder is redissolved, solutions are obtained which are useful in the preparation of regenerated polymeric alcohol films and fibers and as wet and dry strength additives for papers and for other purposes as will be subsequently described.

Xanthate materials which have been decausticized and spray-dried with a substantial reduction in xanthate sulfur content may still be useful if the materials contain xanthate sulfur at a D.S. of at least 3%. Materials having a low D.S. but in excess of 3% may not be wholly soluble in water but in many cases swell to a sufficient extent when mixed with water to make the powders useful as adhesive gelatinous sizing materials for use in the preparation of paper.

In view of the very large number of applications of the decausticized polymeric alcohol xanthate powders and the solutions reconstituted therefrom, it is desirable to set forth a number of such uses in more detail.

Example 26

A clear dilute (0.7% cellulose content) solution of cellulose xanthate having a pH of 11.6 is prepared by dissolving in water a decausticized cellulose xanthate powder prepared by the proces described in Example 11. This dilute decausticized cellulose xanthate solution is used to coat the fibers in papers to produce a high wet and dry strength product. Several types of paper and several coating techniques can be used.

Papers which are treated in accordance with this example include a 15-pound (25.5 g./m.$^2$) hemp paper, starch-sized onionskin paper, and ten-pound (17.0 g./m.$^2$) wood pulp paper. Portions of each paper are coated with decausticized cellulose xanthate solution by dipping, by floating the paper on the cellulose xanthate solution, and by spraying the solution on both sides of the paper. The several papers which are coated are dried at 80° C.–

100° C. for several minutes. The wet strength of the paper increases from 10–15 fold in the cellulose addon range of about 0.5 to 4%. The dry strengths of the papers are increased from 20–50% in the same range. The dry burst strengths are increased two-fold while the wet burst strengths are increased up to eight-fold.

A 14.5-pound (24.2 g./m.$^2$) wood fiber tissue paper is impregnated with varying amounts of decausticized cellulose xanthate. The untreated tissue papers have a dry strength of 1890 g./cm. and a wet strength of 52.4 g./cm. The tissue paper is coated by floating a length of 15.25–22.85 cm. of the paper on the surface of a solution of decausticized cellulose xanthate in a flat pan. The paper is then passed under an aluminum roller and vertically into a flash dryer consisting of three infra-red quartz rods on each side of the paper perpendicular to the direction of travel and in a plane parallel thereto. The oven is only 40.6 cm. long and the paper is in th oven for 30 seconds. Oven air temperature is 180° C. and the paper is moved through in a single pass.

Generally, the paper is dry to the touch just before exit from the infrared oven and may be rewound after leaving the oven. The solution used to treat the paper is a 1% celluolse content solution prepared by redissolving a powder prepared as in Example 11. A portion of the tissue paper is coated to a 4% cellulose addon and heat cured. The wet strength of the impregnated or coated paper has increased to a value of 498 g./cm. Another portion of the paper is coated to a 0.5% cellulose addon and cured as described above. This paper has a Scott wet strength of 441 g./cm. Another portion of the paper is impregnated to a cellulose content of 0.6% and heat cured as described above. The Scott wet strength of the paper has increased to a value of 302 g./cm.

A chopped rayon-hemp (50:50) tissue paper is float-coated as described above to a 0.5% cellulose content with a solution prepared by redissolving a decausticized cellulose xanthate powder prepared from a viscose which was decausticized to a pH of 7.4 by cation exchange and spray-dried as described in Example 11. The coated paper is dried in an infrared oven as described above and has a Scott wet strength of 133 g./cm. as compared to a wet strength of 14 g./cm. for the untreated paper. A 15-pound (25.5 g./m.$^2$) all-wood-pulp tissue containing 0.1% Triton X–100 wetting agent is coated with the same solution to produce a 3.3% cellulose addon. After drying, the paper has a Scott wet strength of 348 g./cm. as compared to 58 g./cm. for the untreated paper.

A portion of the 15-pound (25.5 g./m.$^2$) tissue paper containing Triton X–100 wetting agent is float-coated with a 1% decausticized amylose xanthate solution (pH 11.6) produced by redissolving an amylose xanthate powder prepared as in Example 13. The coated paper is dried in an infrared oven as described above and has a wet strength of 96 g./cm. compared to 58 g./cm. for the untreated paper.

Various types of paper are coated or impregnated with solutions of decausticized cellulose xanthate prepared by redissolving decausticized cellulose xanthate powder, using a spray coating technique. The decausticized cellulose xanthate solution is applied to the paper using a paint sprayer. The spray can be applied in some cases to a single site of the paper while in other cases sprays may be applied to both sides of the paper. The coated paper is dried using an infrared oven as described in connection with the float-coating process. At cellulose addons in the range from 1 to 2%, the wet strength of the paper ranges from 197 to 394 g./cm. (Scott test) as compared to 44.5 g./cm. for the untreated paper.

It has been found that papers impregnated or coated with solutions of decausticized cellulose xanthate are increased substantially in wet and dry strength regardless of the process by which the original viscose solution was decausticized. Thus, solutions prepared from powders which were spray-dried from viscose decausticized by dialysis or by anion or by cation exchange or by ion retardation are effective as wet and dry strength additives for paper.

There are some minor differences between the decausticized cellulose xanthate solutions produced by the various processes, but the compositions are all effective wet and dry strength additives. In general, solutions prepared from material obtained by spray-drying of viscose decausticized by cation exchange give slightly higher wet strength to paper than solutions prepared from powders made by spray drying viscose decausticized by the other processes. This appears to result from the fact that when viscose is treated with a cation exchange material the pH is substantially lower and the cellulose can be regenerated more quickly either by acid treatment or by thermal treatment.

On the other hand, viscose solutions which are neutralized or decausticized by dialysis or anion exchange or ion retardation have the advantage that objectionable odors and colored by-products are removed which are not always removed in the cation exchange treatment. This advantage is also present in the solid products produced by spray drying such decausticized viscose solutions. Of course, as described above, various combination processes may be used to take advantage of the best features of the various above-described decausticization techniques.

Example 27

A 0.5% cellulose content solution of cellulose xanthate is prepared by dissolving in water a powder obtained by spray-drying a viscose solution decausticized to a pH of 10.5 by treatment with cation exchange resin as described in Example 11. The solution is dried as a 30 mil layer on a glass surface at 105° C. This treatment is effective to produce a clear, transparent, coherent, light yellow film which can be used as a packaging film. The film is also adherent to a variety of surfaces when initially formed and thus can be used as a coating material.

Films may also be prepared by thermal regeneration (130° C.) of a 0.5% cellulose content solution of cellulose xanthate prepared by redissolving a powder obtained by spray-drying viscose which had been decausticized to a pH of 11 by dialysis or by anion exchange. These films have thicknesses of 7.6 to 15.2 microns rewet and have Instron strengths of more than 1550 g./mm.$^2$ rewet.

A 1% amylose xanthate solution is prepared by dissolving in water a powder produced by spray drying an amylose xanthate solution decausticized by cation exchange as described in Example 13 to a pH of about 6.5. A portion of the decausticized amylose xanthate solution is formed into a film and regenerated by heating to a temperature of 100° C.

Decausticized cellulose xanthate and decausticized amylose xanthate solutions (as well as other decausticized polymeric alcohol xanthate solutions) can be formed into films usable for packaging and for other similar applications by extrusion through a fine slit into a heated liquid or by casting as a film on a heated drum or a heated belt from which the film is stripped after regeneration of the film-forming material is complete. These solutions can also be cast into films and other materials by extrusion into conventional acid regenerating media.

Example 28

Decausticized cellulose xanthate solutions prepared by dissolving decausticized cellulose xanthate powders produced in accordance with any of the above techniques can be used as an adhesive for forming flat cellulose-impregnated paper into tubes suitable for further processing to form meat casings.

A 2% cellulose content cellulose xanthate solution which is prepared by dissolving in water a powder obtained by spray drying a dialyzed viscose is used to form an adhesive seam along one edge of a 14.5-pound (24.2 g./m.$^2$) hemp tissue paper. Seaming is accomplished by spreading about 9 drops of the solution per meter of 1.0 cm. wide seam. The material is formed into a tube with a lap clamped in a vise and heated with an infrared lamp. The seams which are produced have shear strengths in excess of 1785 g./cm. of seam length. The tubes which are thus produced are used as fibrous casing for meat processing.

Decausticized cellulose xanthate solutions prepared from powders obtained by spray drying of anion exchanged and cation exchanged viscose can similarly be used as an adhesive in forming seams in paper tubing to produce meat casings.

Example 29

A cellulose impregnated high wet strength paper is prepared by impregnating a long fiber hemp tissue paper with decausticized cellulose xanthate (or amylose xanthate) as above described and regenerating the same by acid or thermal treatment.

The paper is continuously formed into tubes (in accordance with commercially used procedures for forming fibrous casings) and impregnated with the decausticized cellulose xanthate solution to a very high cellulose content (paper represents only about 40% wt. of finished product). Alternately, the paper may be formed into tubes and treated with ordinary viscose as in the commercially used procedure for forming fibrous casings. The impregnated tubing is passed through an acid regenerating bath which converts the viscose or decausticized cellulose xanthate solution into regenerated cellulose. At equivalent viscosities, a solution of decausticized cellulose xanthate will penetrate hemp tissue about twice as fast as untreated viscose.

Example 30

In the manufacture of cellulose casings for various meat products, one of the principal problems is the smudging and off-setting of inks used to print legends on the casing.

A solution of decausticized cellulose xanthate is prepared as described above and is sprayed over the freshly printed surface of a cellulose casing and dried at 105° C. The coating is thoroughly effective to prevent smudging and off-setting of the printed matter on the casing. The coating imparts gloss to the product. If desired, a wetting agent may be used in the solution.

Example 31

A decausticized cellulose xanthate solution is prepared by dissolving in water a powder produced as described in any of the various processes above. This solution is used as a pigment binder in ink formulations for printing on regenerated cellulose.

A black ink formulation is prepared by mixing 0.8 g. of carbon black to 400 ml. of 1% cellulose content decausticized cellulose xanthate solution having a pH of 9.0. A few drops of this dispersion are mulled with 0.4 g. of pigment and the resulting slurry added to the dispersion and mixed using a high speed laboratory mixer. A black ink is finally obtained containing 26% pigment.

The ink is used to print on regenerated cellulose meat casings and is cured by heating for a short period at 115° C. The ink has excellent properties (is non-toxic) and is strongly resistant to rubbing and scratching. If desired, lower pigment loadings may be used in making satisfactory ink formulations.

Example 32

A solution is prepared by dissolving in water a powder obtained by spray drying viscose decausticized by cation exchange to pH 9. The solution, having a 0.5% cellulose content, is used for sizing cotton fabric. A piece of 3-ounce (102 g./m.$^2$) cotton muslin sheeting is dipped into the solution at 25° C., allowed to drain, and either air-dried or heated to 80° C. The sized cotton has a substantially crisper feel than control pieces. It is, therefore, apparent that the decausticized cellulose xanthate solution is an effective textile size.

Example 33

In Example 28 it was demonstrated that decausticized cellulose xanthate solutions are effective seaming agents for paper preforms used in the formation of certain types of cellulose impregnated meat casings. Decausticized cellulose xanthate solutions and other decausticized polymeric alcohol xanthate solutions are generally effective as adhesives for cellulosic materials such as paper and wood.

A comparison was made by using a small amount of decausticized cellulose xanthate solution and viscose as an adhesive for paper followed by heat treatment of the adhesive joint. The seam or joint formed using the decausticized cellulose xanthate solution is substantially stronger in a dry state and many fold stronger when the seam is wetted. The decausticized cellulose xanthate solution (and other decausticized polymeric alcohol xanthate solutions) is effective as an adhesive for laminating regenerated cellulose films to produce multi-layer transparent substantially colorless films.

When decausticized cellulose xanthate solutions are used as an adhesive for wood, the joint strength is high enough to delaminate the wood in shear.

Example 34

In this example, a reconstituted solution of decausticized cellulose xanthate is used as a binder in preparing ion exchange membranes.

A solution is prepared by dissolving in water to a 1% cellulose content a powder obtained by spray drying of viscose decausticized to pH 9 by cation exchange. The solution is admixed with 5% of Dowex 1×8Cl resin. A 14.5 lb. (24.2 g./m.$^2$), all-wood-pulp, tissue paper is dipped through the slurry and allowed to drain. The resin used is the 100–200 mesh grade. The treated paper is dried at 100° C.

The paper has a wet strength of 315 g./cm. width. The bound resin has excellent rub resistance. The paper, with the ion exchange resin bound in it, is effective as a membrane for use in dialysis, ion exchange analysis, chromatography, and other similar purposes.

Example 35

In Example 27 the preparation of a film was described. The decausticized polymeric alcohol xanthate solution can be used in the casting of compounded films or fibers by incorporation of a plasticizer such as glycerol or other additives such as dyes or pigments therein before regeneration of the polymeric alcohol (e.g., cellulose, amylose, etc.) xanthate by thermal regeneration or conventional acid treatment.

Example 36

Decausticized viscose or solutions reconstituted from spray dried decausticized viscose can be used as a host for polymer deposition as described in Bridgeford U.S. Patent 3,083,118.

When the decausticized viscose, or reconstituted solution made from the spray dried product, is coated on a film or fiber, it is possible to deposit a guest polymer at the host surface. The coating on the film or fiber is subjected to ion exchange with a salt of a catalyst which is part of a Redox catalyst system for initiating polymerization of a guest polymer.

The film or fiber is then coated or impregnated with a solution of the monomer containing the other component of the Redox catalyst system with the result that polymerization takes place on the surface of the fiber or film at the points where the complementary portion of the catalyst has been deposited by ion exchange.

Example 37

In the preparation of viscose for formation of fibers or films, it is difficult to prepare a material having high D.P., high cellulose content, and low alkali content because the high viscosity makes dissolving, deaeration, and filtration too difficult.

When decausticized viscose of a concentration of 3 to 5% cellulose is added to an untreated viscose just before spinning the resulting composition can have a much lower alkali content, a very high viscosity, and a substantially higher D.P.

It is also possible to prepare decausticized cellulose xanthate solutions having high D.P., high cellulose content and low alkali content by first decausticizing a high D.P. dilute viscose to remove alkaline impurities. The decausticized high D.P. solution is then spray dried as described in the various examples above to produce a stable powder suitable for storage and reuse. The powder can then be redissolved to a very high cellulose content, since the deaeration and filtration were carried out on the dilute solution.

Example 38

Decausticized viscose, or solutions reconstituted from the spray dried product, can be extruded as film or fiber into a solution of a complementary reactant to produce a new polymer in situ. Thus, the extrusion of decausticized viscose, or a reconstituted solution prepared from the spray dried powder, into a solution of an isocyanate or a polyether having isocyanate end groups produces a composite film or fiber.

In one experiment, a mixture of 100 g. carbon tetrachloride, 5 ml. phenyl isocyanate, and 8 drops of Triton X100 was prepared. The mixture was poured slowly into 200 ml. of pH 8, 0.5 cellulose content, cellulose xanthate solution in a blender. The pH of the emulsion was adjusted to 4.5 using acetic acid. The contents were poured into a beaker and allowed to stand at 25° C. for 72 hours. A white gel was recovered from the surface of the aqueous layer which consisted of a cellulose derivative.

In another experiment, adipoyl chloride, in a 1% solution in carbon tetrachloride, was added similarly to 200 ml. of pH 8, 0.5% cellulose content, cellulose xanthate solution. No additional acid was used. After ten minutes' reaction time, the pH was adjusted from 1.4 to 4.0. A cross linked cellulose derivative was recovered.

Example 39

Solutions of decausticized cellulose xanthate can be mixed with other polymeric materials and with low molecular weight materials to produce composite articles. Thus, the low electrolyte content of such solutions permits the mixing of the solution with other materials without coagulation. Dyes, carboxymethylcellulose, amylose, polyvinyl alcohol, polyacrylic acid, and the like can be kept in a finer state of dispersion in solutions of decausticized cellulose xanthate than is possible in untreated viscose. The regeneration of such dispersions is effective to produce novel composite articles (e.g., films, fibers, etc.).

Example 40

Solutions of decausticized cellulose xanthate can be used to coat thermoplastic films to render them adherent to regenerated cellulose to provide for heat sealing of cellulose films to other objects.

Example 41

When hexamethylene diamine and decausticized cellulose xanthate solution are mixed and contacted with a carbontetrachloride solution of adipoyl chloride, a mixture of nylon and nylon-cellulose graft polymers are formed in dispersion. Fibers which are formed of this composition are more hydroscopic and have a wider dyeing range.

Example 42

An aqueous solution of decausticized cellulose xanthate can be used as an interfacial reactant to form cellulose ethers or esters or urethanes from a complementary reactant, such as diphenylmethane, diisocyanate in an inert immiscible solvent such as toluene.

Example 43

Solutions of decausticized cellulose xanthate as a concentrated dope can be cast and then acid regenerated to cellulose films or fibers. From the product it is possible to obtain basic information on the effects of salt coagulation on gel structure apart from acid regeneration effects. This information has not been available in the past because alkali removal has been accompanied by phase changes.

Example 44

Solutions of decausticized cellulose xanthate are used as encapsulating resins for packaging drugs, inks, dyes, etc., in microcapsules. The decausticized solution is used in the formation of such microcapsules by the same techniques used in the prior art for formation of microcapsules from gelatin.

Example 45

A solution of decausticized celulose xanthate was applied to bast fiber in its acid form to produce a coated fiber in which cellulose addons in the range from about 0.5 to 4.5% were obtained. In one experiment a bast fiber paper in the acid form was float-coated with untreated viscose, and decausticized viscose was formed in situ by reaction with the ion-exchange sites on the paper. This coating technique was effective to provide a 1–2% cellulose addon within and around the fibers of the paper. The cellulose can be regenerated by simple storage of the coated fiber at moderately elevated temperatures or by drying at temperatures of the order of 100° C.

Example 46

A solution of decausticized cellulose xanthate is mixed with paper pulp in the formation of paper to promote exhaustion of basic resins onto the paper. The decausticized cellulose xanthate solution can also be used as a beater additive in a paper machine. Upon regeneration, the cellulose acts as a binder for the resin and the paper.

Example 47

Decausticized viscose can be made from a crude viscose which has not been given the conventional deaeration or filtration treatments. Such a crude viscose is much cheaper than a film or fiber grade viscose, but after decausticization by dialysis and/or by ion-exchange, it is effective for use as a wet strength size or coating for paper. Such a decausticized and purified viscose can be spray dried to produce a powder as described in the various examples above, and solutions reconstituted from the spray-dried powder are similarly useful as wet strength sizes or coatings for paper.

Example 48

Halogenated acids, such as chlorocetic acid, may be reacted with decausticized cellulose xanthate in solution and coatings formed on substrates as an ultraviolet barrier.

Example 49

Solutions of decausticized cellulose xanthate, containing a small amount of alkali may be applied to saponifiable film substrates, such as cellulose acetate or polyethylene terephthlate, to improve printability of such films.

Example 50

Solutions of decausticized cellulose xanthate may be used as patching materials for repairing holes in meat casings made from regenerated cellulose.

Example 51

Solutions of decausticized cellulose xanthate are used to coat nylon fibers to produce composite fibers having a regenerated cellulose coating. The resulting product gives better dispersion of fibers in viscose and good matrix fiber adhesion in the formation of non-woven webs. Woven fabrics of such fibers are also useful in that the fabrics have greater absorbency for moisture.

Example 52

Solutions of decausticized cellulose xanthate are used to coat synthetic fibers such as nylon or Dacron, to be incorporated in the formation of synthetic papers. Such solutions may also be used as binders for such papers.

Example 53

Solutions of decausticized viscose can be used as intermediates in the formation of other salts of cellulose xanthate by cation exchange. Thus, when a solution of decausticized cellulose xanthate is passed through a cation exchange resin in the ammonium form, a solution of ammonium cellulose xanthate is obtained. Similarly, if a solution of decausticized cellulose xanthate is passed through a cation exchange resin in the lithium or potassium form, the corresponding lithium or potassium cellulose xanthates are obtained.

Example 54

Solutions of decausticized cellulose xanthate can be used in the preparation of cellulose thiourethanes by the zinc-amine method described in U.S. Patent 2,705,231.

Example 55

Solutions of decausticized cellulose xanthate having a pH of about 7 are used to coat alkali sensitive substrates such as nylon, wool, silk, low D.S. (degree of substitution) cellulose ethers and esters, that cannot otherwise be coated with viscose without damage.

Example 56

Solutions of decausticized cellulose xanthate may be used in making cellulose ethers and esters with a uniformity of substitution that is not easily obtained in heterogeneous esterification or etherification reactions. A solution of decausticized cellulose xanthate is reacted with chlorocetic acid in aqueous solution to produce a cellulose ether or with adipoyl chloride to produce a cellulose ester.

Example 57

Decausticized cellulose xanthate solutions may be used as binders in the formation of non-woven textiles. Thus, bats of glass, mylar, nylon, and cellulose acetate fibers can be impregnated and pressed or cured to form a non-woven fabric.

Example 58

Solutions of decausticized cellulose xanthate may be used to coat glass for protection during shipment or to function as a carrier of a tint for glass windows. The coating serves to keep the glass clean and in thicker layers is protective.

Example 59

Solutions of decausticized viscose may be mixed with soil as a temporary soil binder. As such a binder it can be used for preparation of concrete forms or as an adjunct to other binders used for such purposes.

Example 60

Solution of decausticized cellulose xanthate may be mixed with acid or alkali sensitive ion exchange media such as natural or synthetic zeolites. Natural ion-exchange materials of this type cannot be dispersed into ordinary viscose solutions and extruded into acid baths for regeneration inasmuch as the strong alkali and the regenerating acid tend to degrade the ion exchange material.

A decausticized cellulose xanthate solution can be mixed with a zeolite absorbent and extruded in the form of films or fibers containing the finely divided dispersed zeolite. The zeolite containing fibers or films thus produced can be formed into cigarette filters, ion exchange membranes, and the like.

Example 61

When decausticized cellulose xanthate powder is mixed with wood pulp and treated with iodine or a hypochlorite or peroxide, the xanthates are oxidized to xanthides which function as wet and dry strength sizes for the paper which is produced from the pulp.

Solutions of decausticized cellulose xanthate have been oxidized to xanthide gels by treatment with 0.05 N Iodine-KI, saturated aqueous calcium hypochlorite, and by 2% hydrogen peroxide. It has also been found that the decausticized xanthate solutions can be oxidized to xanthide gels with 2% hydrogen peroxide in concentrations as low as 0.2% cellulose.

Example 62

Partially insoluble (but swellable) powders produced by spray drying of decausticized cellulose xanthate can be added as a dispersion in water to the fiber suspension at the wet end of a paper machine. These xanthates, can then be precipitated onto the fibers by oxidation to the xanthides as described above or by precipitation as a zinc salt. These xanthides can also be precipitated from solutions of decausticized cellulose xanthate.

Example 63

Spray-dried decausticized cellulose xanthate powders can be used in the preparation of high wet strength papers for use in making fibrous meat casings and for tea bags as well as for other applications.

To improve viscose penetration, it is possible to use a paper furnish containing all-rayon fiber or cross-linked rayon, which fibers are of cylindrical or near cylindrical shape and of a length approximating that of hemp fibers.

It is also possible to use fibers from hard woods which do not ordinarily give strong papers because of the short fiber length. However, hardwood fibers give a paper which is more porous and less dense in structure than soft wood papers. The strength of a paper web formed from hardwood fibers can be substantially increased by treatment with a solution of decausticized cellulose xanthate followed by either thermal or acid regeneration. Cellulose loadings as low as 0.1 to 1% are sufficient to produce a grade A paper either from a beaten or unbeaten hardwood furnish.

Example 64

One of the principal advantages of decausticized cellulose xanthate solutions is that pigments that are alkali sensitive can be mixed in with the material and used to form a film or coating of desired color. For example, finely divided aluminum powder or copper powder can be used to provide silver or gold colored films. Ordinarily, metal powders of this type cannot be used in pigmenting regenerated cellulose films due to chemical reactions with the strong alkali in viscose.

Approximately 0.3 g. of aluminum powder was mixed with 160 g. of a 1% solution of decausticized cellulose xanthate (pH 8.5) for 5 minutes. When a film was cast as a thin layer and dried at 100° C. in an oven or 85° C. in a convection oven, a bright silver-colored film was obtained.

A silver coating was also obtained on regenerated cellulose by coating it with the aluminum pigmented solution and drying the coating. The aluminum pigmented solution was also applied to a tissue paper and to a sized white paper to produce a silver-coated paper product.

The adhesion of the pigmented coating was excellent under both wet and dry conditions.

This use of decausticized solutions of cellulose xanthate to act as a binder for alkali sensitive pigments or for other pigments, provides a strong, high, wet, rub-resistant coating.

Example 65

Foaming agents of the type used in producing cellulose sponges can be incorporated into a solution of decausticized cellulose xanthate and the solution used to coat fibers used in the preparation of paper. Paper produced from such coated fibers has exteremely low bulk density and is quite porous.

Example 66

Thin papers, regenerated cellulose films, and other webs are coated with a solution of decausticized cellulose xanthate, and laminated under heat and pressure. The decausticized cellulose xanthate solutions can also be used as laminating adhesives for paper, cellulose films, and other webs, by acid regeneration processes.

Example 67

Tracer compounds can be added to solutions of decausticized cellulose xanthate so that the loading of regenerated cellulose on paper can be readily ascertained. Sodium chloride and potassium chloride have been used as tracers with subsequent determination of the trace quantities of chloride, iodide, or potassium ion. Of course, dyes, radioactive materials, and other such tracers could be used for the same or similar purpose.

Example 68

When solutions of decausticized cellulose xanthate are used to treat paper to improve the wet and/or dry strength of the paper, it has been found that the grain ratio of the paper is substantially improved. Papers which have been treated in this manner to improve wet and/or dry strength have higher transverse to longitudinal strength ratios than the untreated paper or paper treated with other wet or dry strength additives.

Example 69

Solutions of decausticized cellulose xanthate can be applied as a film to coat a surface oxidized polyolefin (which may have a primer coating of a polyisocyanate) and thermally regenerated to produce a cellulose coating on the polyolefin substrate.

Example 70

A solution of decausticized cellulose xanthate, which has been decausticized to a pH of about 6 or which has been subsequently converted to the ammonium cellulose xanthate derivative, is particularly useful in treating tea bag paper stock to produce high wet strength tea bag paper which is free of objectionable odor, colors and taste.

Example 71

Decausticized cellulose xanthate solutions can be used as binders for activated carbon to coat carbon on a paper substrate. Using this decausticized cellulose xanthate solution, it is possible to produce paper products containing 65% activated carbon in which the binder material does not block the carbon pores.

Example 72

A dyed oil can be emulsified into a solution of decausticized cellulose xanthate and the emulsion then used to coat or saturate a substrate to be colored. The resulting product contains encapsulated water-insoluble colored particles which avoids migration of color from the dyeing globules.

Example 73

Solutions of decausticized cellulose xanthate may be applied to a substrate of a film, fiber, or other suitable form and insolubilized after application by oxidation of the xanthate before all of the xanthate has been decomposed in a thermal regeneration process. Such oxidation can be accomplished with iodine, hydrogen peroxide, hypochlorite, etc. This application of the decausticized cellulose xanthate solution differs from Example 62 in that the solution is applied at a time when it is fully soluble and can penetrate into the crevices of the substrate before oxidative cross linking renders it insoluble.

Example 74

Solutions of decausticized cellulose xanthate can be admixed with alkali sensitive proteins, alkali sensitive aldehydes, polymers, alkali sensitive polyesters, etc, and composite films cast therefrom.

Example 75

Finely-divided or microcrystalline cellulose can be bonded to paper using solutions of decausticized cellulose xanthate to produce opaque papers of varying low basis weights. Such papers are particularly useful in reducing postage cost for various printed publications.

Example 76

Solutions of decausticized cellulose xanthate can be used as adhesives for patching holes in regenerated cellulose films and casings and for adhesively closing the ends of tubular regenerated cellulose casings. For example, a few drops of decausticized cellulose xanthate solution can be applied to the inside of the end of a cellulose casing and the end twisted to produce an adhesively-bound closure.

Example 77

Spray-dried decausticized cellulose xanthate powder of very low total sulfur content are particularly useful for paper coating and other uses. Such powders are readily prepared using viscose synthesized by making the xanthate through an interfacial xanthation. It has been found that soluble xanthates can be made at xanthate sulfur contents about one-third of that normally required for conventional xanthation by use of an interfacial xanthation process. Such materials can be neutralized or decausticized by any of the above processes and spray dried to give solid products having very low xanthate sulfur contents while retaining the solubility characteristics of decausticized products obtained from normal viscose.

Example 78

Dry powders of decausticized cellulose xanthate can be used in admixture with various reactive ingredients which are rendered active only when the mixture is redissolved at the time of use. Such mixtures function in a manner somewhat similar to baking powder in that the mixture is unreactive while dry and rendered reactive in solution.

The dry powdered decausticized cellulose xanthate can be admixed with materials such as masked mono- and di-isocyanates. When the material is dissolved in water and coated on paper or when the film cast from a solution is dried, it is insolubilized and cross linked by the isocyanate removed from the masking agent. Materials which may be included are reactive dyes, plasticizers, cationic reagents, emulsifiers, fibers, cross linking agents such as sodium formaldehyde sulfoxolate, dialdehyde starch, dialdehyde guar gum, peroxides, amines, polyisocyanates, etc. Solid acids or materials which hydrolyze to produce acids, such as citric acid, ethyl lactate, delta gluconolactone, etc., may also be used.

From the many examples given above, it is seen that decausticized viscose, and solutions prepared from spray-dried decausticized viscose, are useful for a large variety of purposes for which untreated viscose cannot be used. While most of the procedures described have involved aqueous reaction media, it should be noted that many of the reactions can be carried out in non-aqueous media.

For example, cellulose xanthate dissolved in a non-aqueous solvent such as ethylene chlorohydrin or mixtures of ethylene chlorohydrin with water can be decausticized and subsequently spray dried as described above. The many applications of decausticized viscose, or solutions made from dry powders produced by spray drying of decausticized viscose, are equally applicable as uses for decausticized amylose xanthate solutions and other decausticized polymeric alcohol xanthate solutions, whether freshly prepared or reconstituted from the spray-dried powders.

Decausticized cellulose xanthate solutions can be used also as thickeners in dye solutions, pigment dispersions, and other dispersions or solutions where the chemical instability of the xanthate is not important. Decausticized cellulose xanthate solutions are useful as ore flotation agents and as reactants in recovering metals that form insoluble sulfides. Also, decausticized cellulose xanthate solution can be mixed with cheaper wet strength resins to make intermediate strength resin mixtures.

While this invention has been described with reference to several specific embodiments, it should be understood that within the scope of the appended claims this invention can be practiced otherwise than as specifically described herein.

What is claimed is:

1. A method of preparing xanthates of polymeric alcohols in finely divided, solid, stable form which comprises decausticizing an alkaline solution of a polymeric alcohol xanthate to a pH less than 13 and spray drying the decausticized solution to produce a powdered polymeric alcohol xanthate which is substantially dry and has a D.S. of at least 3%.

2. A method as defined in claim 1 in which the solution treated is viscose.

3. A method as defined in claim 1 in which the solution treated is amylose xanthate.

4. A method as defined in claim 1 in which the solution treated is polyvinyl alcohol xanthate.

5. A method as defined in claim 1 in which the solution treated is polyallyl alcohol xanthate.

6. A method as defined in claim 1 in which the solution is decausticized by dialysis.

7. A method as defined in claim 1 in which the solution is decausticized by neutralization with weak acid.

8. A method as defined in claim 1 in which the solution is decausticized by treatment with a cation exchange material.

9. A method as defined in claim 1 in which the solution is decausticized by treatment with an anion exchange material.

10. A method as defined in claim 1 in which the solution is decausticized by treatment with an ion retarding material.

11. A method as defined in claim 1 in which the solution is sprayed into high velocity gas heated to a temperature of at least 38° C.

12. A method as defined in claim 1 in which the solution is spray dried in admixture with an inert extender material.

13. A method as defined in claim 12 in which the extender material is a pigment.

14. A method as defined in claim 12 in which the extender material is a sizing agent.

15. A method as defined in claim 12 in which the extender material is a clay size.

16. A spray dried, finely divided, powder comprising a polymeric alcohol xanthate substantially free of alkali contaminants, having a pH less than 13 when dispersed at a 1% concentration in water, and having a D.S. of at least 3%.

17. A spray dried powder as defined in claim 16 in which the polymeric alcohol xanthate is a zanthate of cellulose, starch, amylose, dextran, sugar, polyvinyl alcohol, or polyallyl alcohol.

18. A spray dried, finely divided, powder comprising a cellulose xanthate substantially free of alkali contaminants having a pH less than 13 when dispersed at a 1% concentration in water and having a D.S. of at least 3%.

19. A spray dried, finely divided, powder comprising a mixture of a polymeric alcohol xanthate substantially free of alkali contaminants having a pH less than 13 when dispersed at a 1% concentration in water and having a D.S. of at least 3%, with an inert extender.

20. A composition as defined in claim 19 in which said inert extender is a pigment.

21. A composition as defined in claim 19 in which said inert extender is a sizing agent.

22. A composition as defined in claim 19 in which said inert extender is a clay size.

23. A composition as defined in claim 19 in which said inert extender is a desiccant.

References Cited

UNITED STATES PATENTS

| | | | |
|---|---|---|---|
| 1,379,351 | 5/1921 | Lilienfeld. | |
| 2,296,857 | 9/1942 | Lilienfeld. | |
| 2,825,655 | 3/1958 | Meadows. | |
| 2,927,035 | 3/1960 | Wegmann et al. | |
| 3,291,789 | 12/1966 | Bridgeford. | |
| 2,727,837 | 12/1955 | Gregory | 117—157 |
| 2,759,853 | 8/1951 | Smith | 117—157 |
| 2,993,798 | 7/1961 | Hildebrandt | 106—165 |
| 3,146,116 | 8/1964 | Bates | 106—165 |
| 2,697,093 | 12/1954 | Jones | 260—215 |
| 2,714,591 | 10/1955 | Klug et al. | 260—215 |

DONALD J. ARNOLD, *Primary Examiner.*